(12) United States Patent
Nesladek et al.

(10) Patent No.: US 9,405,343 B2
(45) Date of Patent: Aug. 2, 2016

(54) SOCIAL MESSAGING USER INTERFACE

(75) Inventors: Christopher D. Nesladek, San Francisco, CA (US); Jeffrey W. Hamilton, Austin, TX (US); Jeffrey A. Sharkey, Sunnyvale, CA (US); Prasenjit Phukan, Los Altos, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/250,438

(22) Filed: Sep. 30, 2011

(65) Prior Publication Data

US 2012/0023417 A1    Jan. 26, 2012

Related U.S. Application Data

(63) Continuation of application No. 12/914,773, filed on Oct. 28, 2010.

(60) Provisional application No. 61/255,847, filed on Oct. 28, 2009.

(51) Int. Cl.
*G06F 3/0482* (2013.01)
*G06F 1/26* (2006.01)
*G01C 21/26* (2006.01)
(Continued)

(52) U.S. Cl.
CPC .............. *G06F 1/266* (2013.01); *G01C 21/265* (2013.01); *G01C 21/3608* (2013.01); *G06F 1/1632* (2013.01); *G06F 1/329* (2013.01); *G06F 1/3265* (2013.01); *H04M 1/04* (2013.01); *H04M 1/7253* (2013.01); *H04M 1/72569* (2013.01); *H04M 1/72572* (2013.01); *G06F 1/1626* (2013.01); *G06F 2200/1614* (2013.01);
(Continued)

(58) Field of Classification Search
CPC ....... H04L 51/32; H04L 12/588; H04L 51/04; H04L 12/581; G06Q 50/01
See application file for complete search history.

(56) References Cited

U.S. PATENT DOCUMENTS

| 5,640,565 A | 6/1997 | Dickinson |
| 5,737,726 A | 4/1998 | Cameron et al. |

(Continued)

FOREIGN PATENT DOCUMENTS

| DE | 19709518 | 3/1998 |
| EP | 1480422 | 11/2004 |

(Continued)

OTHER PUBLICATIONS

International Search Report & Written Opinion for Application No. PCT/US2010/054578, dated Mar. 28, 2011, 13 pages.

(Continued)

*Primary Examiner* — Namitha Pillai
(74) *Attorney, Agent, or Firm* — Fish & Richardson P.C.

(57) ABSTRACT

Hubs for social interaction via electronic devices are described. In one aspect, a data processing device includes a display screen displaying a social interaction hub, the social interaction hub including a collection of records. Each record includes a counterparty identifier identifying a counterparty of a past social interaction event, a mode indicium identifying a mode by which the past social interaction event with the counterparty occurred, and a collection of mode indicia each identifying a mode by which a future, outgoing social interaction event with the counterparty can occur. The counterparty identifier, the mode indicium, and the collection of mode indicia are associated with one another in the records of the social interaction hub.

18 Claims, 14 Drawing Sheets

(51) Int. Cl.
*G01C 21/36* (2006.01)
*G06F 1/32* (2006.01)
*H04M 1/04* (2006.01)
*H04M 1/725* (2006.01)
*G06F 1/16* (2006.01)

(52) U.S. Cl.
CPC ...... *H04M 1/72533* (2013.01); *H04M 2250/02* (2013.01); *H04M 2250/74* (2013.01); *Y02B 60/1242* (2013.01)

(56) References Cited

U.S. PATENT DOCUMENTS

| | | | |
|---|---|---|---|
| 5,873,108 | A | 2/1999 | Goyal et al. |
| 5,923,848 | A | 7/1999 | Goodhand et al. |
| 5,950,193 | A | 9/1999 | Kulkarni |
| 6,209,005 | B1 | 3/2001 | Harker et al. |
| 6,230,132 | B1 | 5/2001 | Class et al. |
| 6,269,369 | B1 | 7/2001 | Robertson |
| 6,434,564 | B2 | 8/2002 | Ebert |
| 6,539,379 | B1 | 3/2003 | Vora et al. |
| 6,557,004 | B1 | 4/2003 | Ben-Schachar et al. |
| 6,597,378 | B1 | 7/2003 | Shiraishi et al. |
| 6,668,281 | B1 | 12/2003 | Ayyadurai |
| 6,718,366 | B2 | 4/2004 | Johnstone et al. |
| 6,731,308 | B1 | 5/2004 | Tang et al. |
| 6,829,607 | B1 | 12/2004 | Tafoya et al. |
| 6,983,310 | B2 | 1/2006 | Rouse et al. |
| 6,985,924 | B2 | 1/2006 | Schwartz et al. |
| 6,990,495 | B1 | 1/2006 | Grason et al. |
| 7,010,572 | B1 | 3/2006 | Benjamin et al. |
| 7,146,570 | B2 | 12/2006 | Yeh et al. |
| 7,185,290 | B2 | 2/2007 | Cadiz et al. |
| 7,240,298 | B2 | 7/2007 | Grossman et al. |
| 7,325,012 | B2 | 1/2008 | Nagy |
| 7,360,172 | B2 | 4/2008 | Grossman et al. |
| 7,360,174 | B2 | 4/2008 | Grossman et al. |
| 7,418,663 | B2 | 8/2008 | Pettinati et al. |
| 7,430,719 | B2 | 9/2008 | Pettinati et al. |
| 7,555,573 | B2 | 6/2009 | Cummins et al. |
| 7,610,564 | B1 | 10/2009 | Pfohe et al. |
| 7,636,719 | B2 | 12/2009 | Thompson et al. |
| 7,774,823 | B2 | 8/2010 | Goldthwaite et al. |
| 7,802,191 | B2 | 9/2010 | Pettinati et al. |
| 7,814,438 | B2 | 10/2010 | Grossman et al. |
| 7,953,759 | B2 | 5/2011 | Grossman et al. |
| 8,006,190 | B2 | 8/2011 | Quoc et al. |
| 8,224,359 | B2 | 7/2012 | Marlow et al. |
| 8,341,535 | B2 | 12/2012 | Lyman |
| 8,620,283 | B2 | 12/2013 | Lee et al. |
| 2002/0073207 | A1 | 6/2002 | Widger et al. |
| 2002/0167519 | A1 | 11/2002 | Olsen |
| 2003/0046296 | A1 | 3/2003 | Doss et al. |
| 2003/0069874 | A1 | 4/2003 | Hertzog et al. |
| 2003/0164862 | A1 | 9/2003 | Cadiz et al. |
| 2003/0195018 | A1 | 10/2003 | Lee |
| 2004/0021647 | A1 | 2/2004 | Iwema et al. |
| 2004/0119761 | A1 | 6/2004 | Grossman |
| 2004/0133345 | A1 | 7/2004 | Asahara |
| 2004/0268265 | A1 | 12/2004 | Berger |
| 2005/0073443 | A1 | 4/2005 | Sheha et al. |
| 2005/0235209 | A1 | 10/2005 | Morita et al. |
| 2005/0262208 | A1 | 11/2005 | Haviv et al. |
| 2006/0031370 | A1 | 2/2006 | Lyle et al. |
| 2006/0036945 | A1 | 2/2006 | Radtke et al. |
| 2006/0069458 | A1 | 3/2006 | Lee et al. |
| 2006/0101350 | A1 | 5/2006 | Scott |
| 2006/0119507 | A1 | 6/2006 | Cawse |
| 2006/0135197 | A1 | 6/2006 | Jin et al. |
| 2006/0148500 | A1 | 7/2006 | Glenner et al. |
| 2006/0178813 | A1 | 8/2006 | Chen |
| 2006/0253787 | A1 | 11/2006 | Fogg |
| 2006/0277213 | A1 | 12/2006 | Robertson et al. |
| 2007/0121867 | A1 | 5/2007 | Ozugur et al. |
| 2007/0264977 | A1 | 11/2007 | Zinn et al. |
| 2008/0155080 | A1 | 6/2008 | Marlow et al. |
| 2008/0313574 | A1 | 12/2008 | Aravamudan et al. |
| 2009/0007187 | A1 | 1/2009 | Koul |
| 2009/0077497 | A1 | 3/2009 | Cho et al. |
| 2009/0177744 | A1 | 7/2009 | Marlow |
| 2009/0187831 | A1* | 7/2009 | Tiwana et al. ............... 715/752 |
| 2009/0222766 | A1 | 9/2009 | Chae et al. |
| 2009/0239588 | A1 | 9/2009 | Nam |
| 2009/0265103 | A1 | 10/2009 | Kostepen |
| 2010/0017732 | A1 | 1/2010 | Matsushima et al. |
| 2010/0169364 | A1 | 7/2010 | Hardt |
| 2010/0214571 | A1 | 8/2010 | Luo |
| 2011/0047508 | A1 | 2/2011 | Metzler et al. |
| 2011/0099486 | A1 | 4/2011 | Nesladek et al. |
| 2011/0112899 | A1* | 5/2011 | Strutton et al. ............ 705/14.41 |
| 2013/0125052 | A1 | 5/2013 | Baird |

FOREIGN PATENT DOCUMENTS

| | | |
|---|---|---|
| EP | 1936606 | 6/2008 |
| EP | 2026328 | 2/2009 |
| JP | 2000-337911 | 12/2000 |
| JP | 2001-141501 | 5/2001 |
| JP | 4244068 | 3/2009 |
| KR | 10-2002-0082510 | 10/2002 |
| KR | 10-2009-0029518 | 3/2009 |
| KR | 10-2009-0093444 | 9/2009 |

OTHER PUBLICATIONS

Tezuka, Taro and Katsumi Tanaka, "Temporal and Spatial Attribute Extraction from Web Documents and Time-Specific Regional Web Search System.", Web and Wireless Geographical Information Systems: 4th International Workshop, Nov. 2004, vol. 3428, pp. 14-25.

Padwick, Feddema, Special Edition Using Microsoft Outlook 2000, Que, Ch. 9 'Managing Contacts', p. 297-318.

Padwick, Feddema, Special Edition Using Microsoft Outlook 2000, Que, Ch. 16 'Managing Your Computer Environment': Using Other Shortcuts in the Outlook Bar, p. 509-513.

Padwick, Feddema, Special Edition Using Microsoft Outlook 2000, Que, Ch. 18 'Finding and Organizing Outlook Items': Using the QuickFind Contact Tool, p. 527-530.

Padwick, Feddema, Special Edition Using Microsoft Outlook 2000, Que, Ch. 18 'Finding and Organizing Outlook Items': Organizing Outlook Items, p. 560-563.

Padwick, Feddema, Special Edition Using Microsoft Outlook 2000, Que, Ch. 22 'Creating and Using Rules', p. 617-622.

Padwick, Feddema, Special Edition Using Microsoft Outlook 2000, Que, Ch. 38 'Creating Views and Print Styles', p. 943-971.

Padwick, Feddema, Special Edition Using Microsoft Outlook 2000, Que, Ch. 41 'Creating and Using Custom Fields': Why Do You Need Custom Fields?, p. 1093-1120.

Padwick, Feddema, Special Edition Using Microsoft Outlook 2000, Que, Appendix C 'Outlook's Files, Folders, Fields, and Registry Keys', p. 1295-1298.

Taylor, T.C., Databases Save Time and Customers, Sales & Marketing Management, vol. 142, No. 4, p. 105-7, Mar. 1990.

Kubota, K.; Masuno, H., Multi-Media Software PI, NEC Technical Journal, vol. 41, No. 13, p. 72-6, Nov. 1988.

Pettigrew, T., ACT!—Automated Contact Tracking, CA Magazine, vol. 95, No. 1022, p. 48-9, Sep. 1991.

Simaioforidis, A.; Karlgren, J.; Ereback, A., Research and Advanced Technology for Digital Libraries, Second European Conference, ECDL '98. Proceedings, p. 673-4, Sep. 21-23, 1998.

Heller, S.R., Symantec ACT! 4.0 for Windows, Journal of Chemical Information and Computer Sciences, vol. 38, No. 4, p. 772, Jul.-Aug. 1998.

International Search Report issued in PCT/US2010/054557 on Mar. 25, 2011, 11 pages.

International Search Report issued in PCT/US2010/054472 on Mar. 25, 2011, 11 pages.

International Search Report issued in PCT/US2010/054570 on Mar. 25, 2011, 12 pages.

International Search Report issued in PCT/US2010/054585 on Mar. 25, 2011, 11 pages.

(56) References Cited

OTHER PUBLICATIONS

International Search Report issued in PCT/US2010/052024 on Jun. 10, 2011, 11 pages.
International Preliminary Report on Patentability in International Application No. PCT/US2010/054570, mailed May 10, 2012, 9 pages.
Office Action in Australian Application No. 2010319867, mailed May 8, 2014, 3 pages.
Office Action in Australian Application No. 2010319860, mailed Jul. 30, 2014, 3 pages.
International Search Report issued in PCT/2010/054557 on Mar. 25, 2011.
International Search Report issued in PCT/US2010/054472 on Mar. 25, 2011.
International Search Report issued in PCT/US2010/054570 on Mar. 25, 2011.
International Search Report issued in PCT/US2010/054578 on Mar. 28, 2011.
International Search Report issued in PCT/US2010/054585 on Mar. 25, 2011.
International Search Report issued in PCT/US2010/052024 on Jun. 10, 2011.
International Preliminary Report on Patentability issued in PCT/US2010/052024 on May 1, 2012, 7 pages.
Brooke, "Action Menu-Ads Additional Options to Cut, Copy and Paste Functionality," accessed Dec. 3, 2013, 8 pages http://www.appleiphoneschool.com/2009/09/14/action-menu-adds-additional-options-to-cut-copy-and-paste-functionality/.
Machine translation of Detailed Description of JP 2000-337911 from Patent Abstracts of Japan.
Machine translation of Detailed Description of JP 2001-141501from Patent Abstracts of Japan.
Sjeiti, "SFBrowser," dated Jun. 29, 2008, 5 pages.
Uncertified Machine translation of Detailed Description of KR 10-2002-0082510.
Office Action in Japanese Application No. 2012-536837, mailed May 12, 2014, 6 pages (with English translation).

\* cited by examiner

| COUNTERPARTY | E-MAIL | | PHONE | | NETWORK_1 | | NETWORK_2 | | PHOTO_1 | |
|---|---|---|---|---|---|---|---|---|---|---|
| | in | out | in | out | in | out | in | out | in | out |
| party_a | 1 | 1 | 1 | 1 | 0 | 0 | 0 | 1 | 0 | 0 |
| party_b | 0 | 0 | 1 | 1 | 0 | 1 | 1 | 0 | 0 | 0 |
| group_a | 1 | 1 | 1 | 1 | 1 | 0 | 0 | 1 | 1 | 1 |
| party_... | ... | ... | ... | ... | ... | ... | ... | ... | ... | ... |
| party_n | 1 | 0 | 1 | 0 | 0 | 0 | 0 | 0 | 0 | 1 |

FIG. 12

SOCIAL MESSAGING USER INTERFACE

CROSS-REFERENCE TO RELATED APPLICATIONS

This application is a continuation of U.S. application Ser. No. 12/914,773, filed Oct. 28, 2010, entitled "Social Messaging User Interface," which claims priority to U.S. Provisional Application Ser. No. 61/255,847, filed on Oct. 28, 2009, entitled "Search, Navigation, and Docking with a Mobile Computing Device," the contents of which are incorporated herein by reference.

BACKGROUND

This specification relates to a hub for social interaction via electronic devices.

It has been said that "no man is an island." Perhaps unsurprisingly, humans have developed electronic devices and mechanisms that promote social interaction by facilitating the exchange of messages, photos, media, and other information between individuals. For example, mobile phones allow users to speak with one another without being tied to a fixed landline. Electronic mail and text messages are delivered nearly instantaneously. Photo sharing websites host photos posted by individuals for their friends and associates to view. Social networks such as FACEBOOK and MYSPACE allow large groups to remain in contact. Message boards allow communities with common interests to share information and discuss relevant issues. Blogs and other pages allow people to comment on content and converse with even unknown individuals.

SUMMARY

This specification describes a hub and corresponding user interface for the social interaction that occurs via electronic devices and mechanisms. The hub can be a center where information regarding different social interaction mechanisms is gathered and organized. The hub can allow a user to integrate those social interaction mechanisms by providing an overview of the different mechanisms and allowing users to facilely transition between different mechanisms.

In one aspect, a data processing device includes a display screen displaying a social interaction hub, the social interaction hub including a collection of records. Each record includes a counterparty identifier identifying a counterparty of a past social interaction event, a mode indicium identifying a mode by which the past social interaction event with the counterparty occurred, and a collection of mode indicia each identifying a mode by which a future, outgoing social interaction event with the counterparty can occur. The counterparty identifier, the mode indicium, and the collection of mode indicia are associated with one another in the records of the social interaction hub.

This and other aspects can include one or more of the following features. The collection of mode indicia can be limited to modes of social interaction that are available for social interaction with the counterparty. At least one of the records can include an availability indicator labeling a first mode indicium in the collection of mode indicia. The availability indicator can indicate that the counterparty is presently available for social interaction via the mode identified by the first mode indicium. The first mode indicium can identify an electronic messaging mode. Each record can also include an interactive graphical element that triggers display of the collection of mode indicia in response to user interaction. Each record can also include a description of a subject of the past social interaction event. For example, a first description of the subject of a first past social interaction event can include a subject line of an electronic mail or text message. A second description of the subject of a second past social interaction event can include an excerpt of a posting on a social network. The mode indicia can identify both direct social interaction modes in which information can be exchanged directly with the counterparty and modes mediated by a social network server. At least some the mode indicia in the collection can be variants of the mode indicium identifying the mode by which the past social interaction event occurred. The social interaction hub can include information describing a disposition of the currently displayed social interaction records within a larger collection of social interaction records and an interactive graphical element that triggers display of additional social interaction records within the larger collection in response to user interaction.

In another aspect, a data processing device includes a display screen displaying a social interaction hub. The social interaction hub includes a collection of records each characterizing a past social interaction event. The characterized social interaction events including direct social interaction events in which users have exchanged information directly with one another and a social interaction event mediated by a social network server. The records characterizing the direct social interaction events are interspersed with the records characterizing the social interaction events mediated by the social network server.

This and other aspects can include one or more of the following features. The records characterizing the direct social interaction events and the records characterizing the social interaction events mediated by the social network server can be ordered chronologically according to order of occurrence. Each record can include one or more of the following: a counterparty identifier identifying a counterparty of a past social interaction event; a mode indicium identifying a mode by which the past social interaction event with the counterparty occurred; a collection of mode indicia each identifying a mode by which a future, outgoing social interaction event with the counterparty can occur; and an interactive graphical element that triggers display of the collection of mode indicia in response to user interaction. Each record can include a description of a subject of the past social interaction event.

In another aspect, a user-portable device includes a display screen, one or more data communication interfaces, a data storage device configured to store a phone/message log, and a data processing system programmed to perform activities in accordance with the logic of one or more sets of machine-readable instructions. The operations include one or more server interface modules for interfacing with a social network server, a data aggregation module for aggregating data received from the phone/message log and data received from the one or more server interface modules, and a user interface module for presenting aggregated data in a collection of records on the display screen. Each record includes a counterparty identifier identifying another user and a collection of mode indicia each identifying a mode by which a future, outgoing social interaction event with the counterparty can occur. At least one of the records comprises information received from the phone/message log and information received from one or more server interface modules.

This and other aspects can include one or more of the following features. The information received from one or more server interface modules can include an availability indicator indicating that a second user is presently available for social interaction via a particular mode. The information received from the phone/message log can include a time when a past telephone call occurred. At least one of the records in the collection of records can include a social status record characterizing a status of a second user. The user-portable device can include a contact information data store storing contact information. The data aggregation module can also aggregate data received from the contact information data store with the data received from the phone/message log and the data received from the one or more server interface modules. The data received from the contact information data store can include a photo of a second user. The records in the collection can each characterize a past social interaction event. The data aggregation module can also filter past social interaction events to limit the past social interaction events characterized in the collection. The data aggregation module can filter past social interaction events to limit the past social interaction events characterized in the collection based on counterparties involved in the past social interaction events. The data aggregation module can also resolve conflicts between data received from the phone/message log and data received from the one or more server interface modules.

In another aspect, a computer-implemented communication method includes displaying a list of contacts to a user of a computing device, the list of contacts including acquaintances of the user, receiving a user selection of an entry in the list of contacts, generating a control bar shows each of a plurality of modes by which the acquaintance can be communicated with, and beginning communication immediately via one of the modes in response to a user of the device selecting an icon for the one of the modes to begin communicating immediately via the one of the modes.

In another aspect, a computer-implemented communication method includes displaying identifiers of acquaintances of a user in a plurality of contexts in an operating system on a computing device of the user, receiving a user selection of one of the identifiers, identifying a plurality of communication modes by which an acquaintance who corresponds to the selected identifier can be contacted, displaying a selectable control for each of the plurality of communication modes by which the acquaintance can be contacted, receiving a selection of a selectable control, and presenting the mode of communication corresponding to the selected control to the user for communicating with the acquaintance.

This and other aspects can include one or more of the following features. Displaying the selectable control can include displaying a peek of recent communication associated with the acquaintance via the corresponding mode of communication.

In another aspect, a social networking system includes an application programming interface, a plurality of a social networking services providing information about members of the services upon request from remote clients that are properly authenticated, and a plurality of computing devices operating via the application programming interface to submit requests for information from the social networking services associated with acquaintances for user of the computing devices via applications that each show information from a plurality of different social networking services using the application programming interface. Each of the plurality of computing devices is programmed to generate a control bar that shows mechanisms by which acquaintances of the users of the computing devices can be communicated with in response to the users pressing an image of such an acquaintance.

In another aspect, a data processing device includes a display screen, one more data storage devices storing a database of integrated contact information and account information, and one or more data processors. The contact information includes contact identifiers that each identifies a potential counterparty for social interaction. The account information includes a first record characterizing a first account of at least one of the potential counterparties at a first entity that mediates social interaction and a second record characterizing a second account of at least one of the potential counterparties at a second entity that mediates social interaction. The first and second records characterizing the first and second accounts each includes the contact identifier of the at least one potential counterparty and are dispersed among other records characterizing other accounts of others of the potential counterparties, wherein the other records each includes a respective contact identifier identifying respective of the other potential counterparties. The one or more data processors are programmed to access the database of integrated contact information and identify the first and second records using the contact identifier of the at least one potential counterparty and display, at the same time on the display screen, a first graphical element indicating that outgoing social interaction mediated by the first entity is available and a second graphical element indicating that outgoing social interaction mediated by the second entity is available.

This and other aspects can include one or more of the following features. The first record can include an entry comprising an identifier of the category of the first account, wherein the identifier is selected from the group consisting of an identifier of a social network account and an identifier of a photo sharing network account. The data processors can also be programmed to implement a first interface module for interfacing with the first entity in accordance with the characterization of the first account in the first record, a second interface module for interfacing with the second entity in accordance with the characterization of the second account in the second record, or both such a first and second interface module. The first entity can include a social network server. The first interface module can be configured to excerpt a post by the at least one of the potential counterparties available on the social network server. The display screen can be a touch screen. The first and second graphical elements can be interactive elements displayed on the touch screen. The one or more data processors can be programmed to detect user interaction with a selected one of the first and second graphical elements and trigger the outgoing social interaction indicated by the selected one of the first and second graphical elements in response to the user interaction. A social interaction hub displayed on the display screen can include the graphical elements indicating that outgoing social interaction mediated by the first and second entity is available. The data processing device can be a handheld device that comprises a phone interface.

In another aspect, a data processing device includes a display screen, one more data storage devices storing account information, and one or more data processors. The contact information includes contact identifiers that each identifies a potential counterparty for social interaction. The account information including a first record characterizing a first representation of a first of the potential counterparties at a first account provided by a first entity that mediates social interaction and a second record characterizing a second representation of the first of the potential counterparties at a second account provided by a second entity that mediates social interaction. The first and second records characterizing the first and second representations each includes data drawn from the respective of the first and second entities and are dispersed among other records characterizing other representations of others of the potential counterparties. The one or more data processors are programmed to access the database of integrated contact information and identify the first and second records using the identifier of the at least one potential counterparty and display, at the same time on the display screen, a first graphical element indicating that outgoing social interaction mediated by the first entity is available and a second graphical element indicating that outgoing social interaction mediated by the second entity is available.

This and other aspects can include one or more of the following features. The database can include an row in a data table comprising an identifier of the category of the first account, wherein the identifier is selected from the group consisting of an identifier of a social network account and an identifier of a photo sharing network account. The data processors can also programmed to implement a first interface module for interfacing with the first entity to obtain information characterizing the first of the potential counterparties from the first entity and a second interface module for interfacing with the second entity to obtain information characterizing the first of the potential counterparties from the second entity. The first entity can be a social network server. The first interface module can be configured to excerpt a post by the at least one of the potential counterparties available on the social network server. The display screen can be a touch screen. The first and second graphical elements can be interactive elements displayed on the touch screen. The one or more data processors can be programmed to detect user interaction with a selected one of the first and second graphical elements and trigger the outgoing social interaction indicated by the selected one of the first and second graphical elements in response to the user interaction. A social interaction hub displayed on the display screen can include the graphical elements indicating that outgoing social interaction mediated by the first and second entity is available. The data processing device can be a handheld device that comprises a phone interface.

In another aspect, a data processing device includes a display screen, one more data storage devices, and one or more data processors. The one more data storage devices storing account information including a first record characterizing a first representation of an individual at a first account at a first entity that mediates social interaction, first status update information characterizing a first status update drawn from the first account, the first status update information including a characterization of the updated first status and a characterization of the time when first status was updated, a second record characterizing a second representation of the individual at a second account at a second entity that mediates social interaction, and second status update information characterizing a second status update drawn from the second account, the second status update information including a characterization of the updated second status and a characterization of the time when the second status was updated. The one or more data processors are programmed to access the first and second representations of the individual and identify the characterizations of the times when the first and the second status were updated, compare the times when the first and the second status were updated to determine the more recent of the first and the second status updates, and display, on the display screen, the more recent of the first and the second status updates based on the comparison of the times when the first and the second status were updated.

This and other aspects can include one or more of the following features. The first record can be an row in a data table comprising an identifier of the category of the first account, wherein the identifier is selected from the group consisting of an identifier of a social network account and an identifier of a photo sharing network account. The one or more data processors can be programmed to display the more recent status update in a social status record that comprises an identifier of the individual and a collection of indicia that identify modes by which a future outgoing social interaction event with the individual can occur. The social status record can include a location description that describes either the present location of the individual, an availability indicator that indicates that the individual is presently available for social interaction via one of the modes, or both. The first and second status update information can be found in respective first and second status update records. The first and second records can be instantiated as first and second rows in a first data table. The first and second status update information is found in two different rows of a second data table. The rows of the second data table can each reference a respective one of the first and second rows in the first data table. The one or more data processors can be programmed to display the more recent status update on a display screen in a social interaction record that includes a visual indicium characterizing a social interaction event with the individual that has already occurred. The social interaction record can include one or more visual indicia representing multiple modes by which a future, outgoing social interaction events with the individual can occur. The display screen can be a touch screen. The visual indicia representing multiple modes can be interactive elements displayed on the touch screen. The one or more data processors can be programmed to detect user interaction with a selected one of the visual indicia representing multiple modes and trigger the outgoing social interaction represented by the selected one of the visual indicia in response to the user interaction.

These and other aspects can, in certain of the implementations described herein, provide the following advantages. An application may provide access to communication with a user's acquaintances through a variety of communication modes, including by social networking sites. A user's contact list may be displayed on a mobile device in alphabetical order. When the user presses an image of an acquaintance, a control bar can be generated that shows each of the mechanisms by which the acquaintance can be communicated with. The user of the device may then select an icon for one of the modes to begin communicating immediately via that mode. For example, pressing the telephone icon can cause the acquaintance's telephone number to be dialed, while pressing a social networking icon can cause a text box to be presented so that one can write on the other user's wall.

Other manipulation of the input control can cause recent communications by the particular mode of communication to be displayed. For example, long pressing on a social networking icon can cause the last five posts to the acquaintances wall to be display for the user.

The interface may also be genericized, so that any image of acquaintances can be an object that exhibits the behavior shown here. Thus, for example, whenever a user sees a photo of an acquaintance, the user will know that he or she can quickly access modes of communicating with that acquaintance.

Data for such an application may be provided via a standard and public API. For example, when a user makes the interactions described above, the user's device may make requests to data sources internal to the device (e.g., contact information) and to services outside the device (e.g., social networks), which may then return information according to the pre-determined requests. Such services may also authenticate a user before providing the user with certain forms of information.

The details of one or more implementations of the subject matter described in this specification are set forth in the accompanying drawings and the description below. Other features, aspects, and advantages will become apparent from the description, the drawings, and the claims.

BRIEF DESCRIPTION OF THE DRAWINGS

FIG. 12 is a schematic representation of a collection of user preference information that specifies limitations on the characterization of past social interaction events in a social interaction hub.

Like reference numbers and designations in the various drawings indicate like elements.

DETAILED DESCRIPTION

Figure 1:
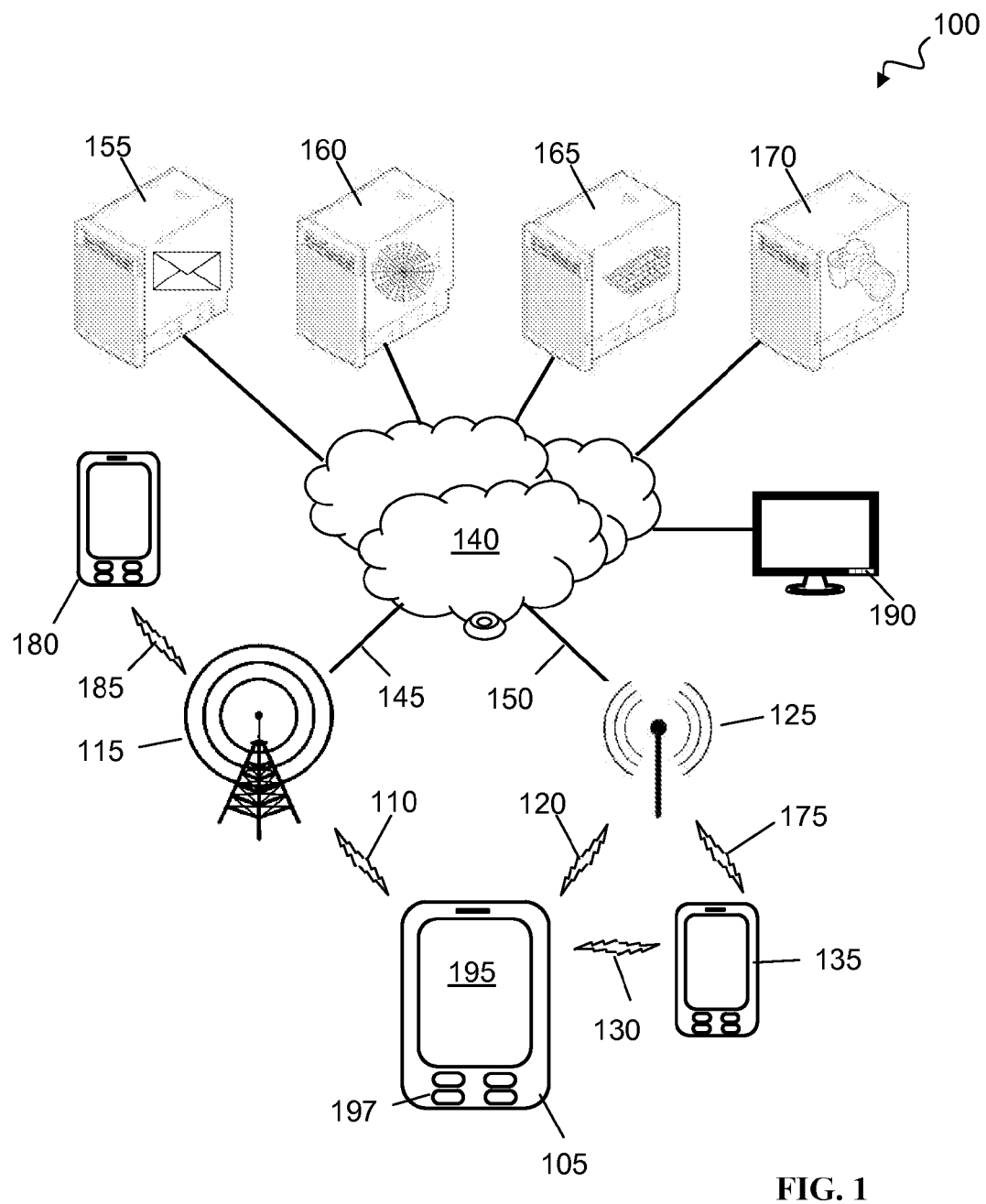
FIG. 1 is a schematic representation of a system of electronic devices that exchange information and provide social interaction.

FIG. 1 is a schematic representation of a system 100 of electronic devices that exchange information and provide social interaction. System 100 includes a handheld, mobile device 105 that is associated with a first individual user. Mobile device 105 includes one or more wireless or wired data communication components. The user of mobile device 105 can use the data communication components to interact socially with other individuals, as described further below.

In the illustrated implementation of system 100, mobile device 105 includes two wireless data communication components, namely, a mobile phone transceiver and a WiFi transceiver. The mobile phone transceiver is able to exchange messages 110 with a phone base station 115. The WiFi transceiver is able to exchange messages 120 with a WiFi access point 125 and messages 130 with a peer mobile device 135 that also includes a WiFi transceiver. Peer mobile device 135 is associated with another individual user.

Phone base station 115 and WiFi access point 125 are connected for data communication with one or more data communication networks 140 via data links 145, 150 and can exchange information with social interaction servers 155, 160, 165, 170. In some implementations, peer mobile device 135 may also be able to exchange messages 175 with WiFi access point 125 (or another WiFi access point) for data communication with data communication networks 140 and access to social interaction servers 155, 160, 165, 170. One or more additional mobile devices 180, which are associated with one or more other individual users, may also be able to exchange messages 185 with phone base station 115 (or another base station) for data communication with data communication networks 140 and access to social interaction servers 155, 160, 165, 170. One or more personal computing devices 190, which are associated with one or more other individual users, may also be connected for data communication with one or more data communication networks 140 via a data link 190 for access to social interaction servers 155, 160, 165, 170.

System 100 supports both direct and server-mediated social interaction by the users with whom device 105, 135, 180, 190 are associated. Direct social interaction allows users to send messages, photos, or other media directly to one another. For example, the user with whom device 105 is associated can telephone the user with whom device 180 is associated. These user can talk to one another directly, without intermediation by a server. As another example of direct social interaction, the user with whom device 105 is associated can establish a peer-to-peer wireless link with the user with whom device 135 is associated. These users can, e.g., text one another or send photos to one another.

Server-mediated social interaction allows users to exchange messages, photos, or other media with a server data processing device mediating the exchange. The illustrated implementation of system 100 includes four different examples of servers that can mediate such social interaction, namely, an electronic mail server 155, a social network server 160, a text message server 165, and a photo server 170. Each of social interaction servers 155, 160, 165, 170 includes one or more data processors that are programmed to perform data processing activities that mediate social interaction. For example, electronic mail server 155 is programmed to allow a user to access electronic mail from an electronic mail client. Social network server 160 is programmed to allow users to access a social network where messages, photos, and/or other media are exchanged. For examples, social network server 160 can support social networks such as FACEBOOK™, MYSPACE™, YAHOO! 360™, LINKEDIN™, ESSEMBLY™, ORKUT™, FRIENDSTER™, and others.

Text message server 165 is programmed to allow a user to exchange text messages with other users. Photo server 170 is programmed to allow a user to access a collection of one or more photographs posted to photo server 170 by other individuals. In some implementations, photo server 170 may restrict a user to accessing photographs posted by other individuals who have somehow approved the user's access.

For each user with whom a device 105, 135, 180, 190 is associated, social interaction events provided by system 100 can be classified as either "outgoing" or "incoming." In the context of a user with whom device 105 is associated, outgoing social interaction events include, e.g., outgoing phone calls and text messages, e-mail messages sent to other users, photographs posted to photo server 170, comments posted on a social network hosted by social network server 160, posts to message boards, comments on blog or other pages, and the like. In the context of a user with whom device 105, 135, 180, 190 is associated, incoming social interaction events include, e.g., incoming phone calls and text messages, e-mail messages received from other users, comments posted by other users on photographs posted to photo server 170, comments posted on the user's page in a social network hosted by social network server 160, responses to that users posts to message boards or blog or other comments, and the like.

In addition to one or more wireless or wired data communication components, mobile device 105 can also include a display screen 195 and one or more input devices 197. In some implementations, display screen 195 can act as both an input and an output. For example, display screen 195 can be a touch screen that both displays graphical elements on a screen and detects the presence and location of interaction with the screen. Input devices 197 can include one or more, e.g., key, pad, trackball, or other component that receives mechanical, audio, or other input from a user. In some implementations, mobile device 105 can include additional components such as a GPS unit, accelerometers, a digital camera, audio jacks, and the like.

Figure 2:
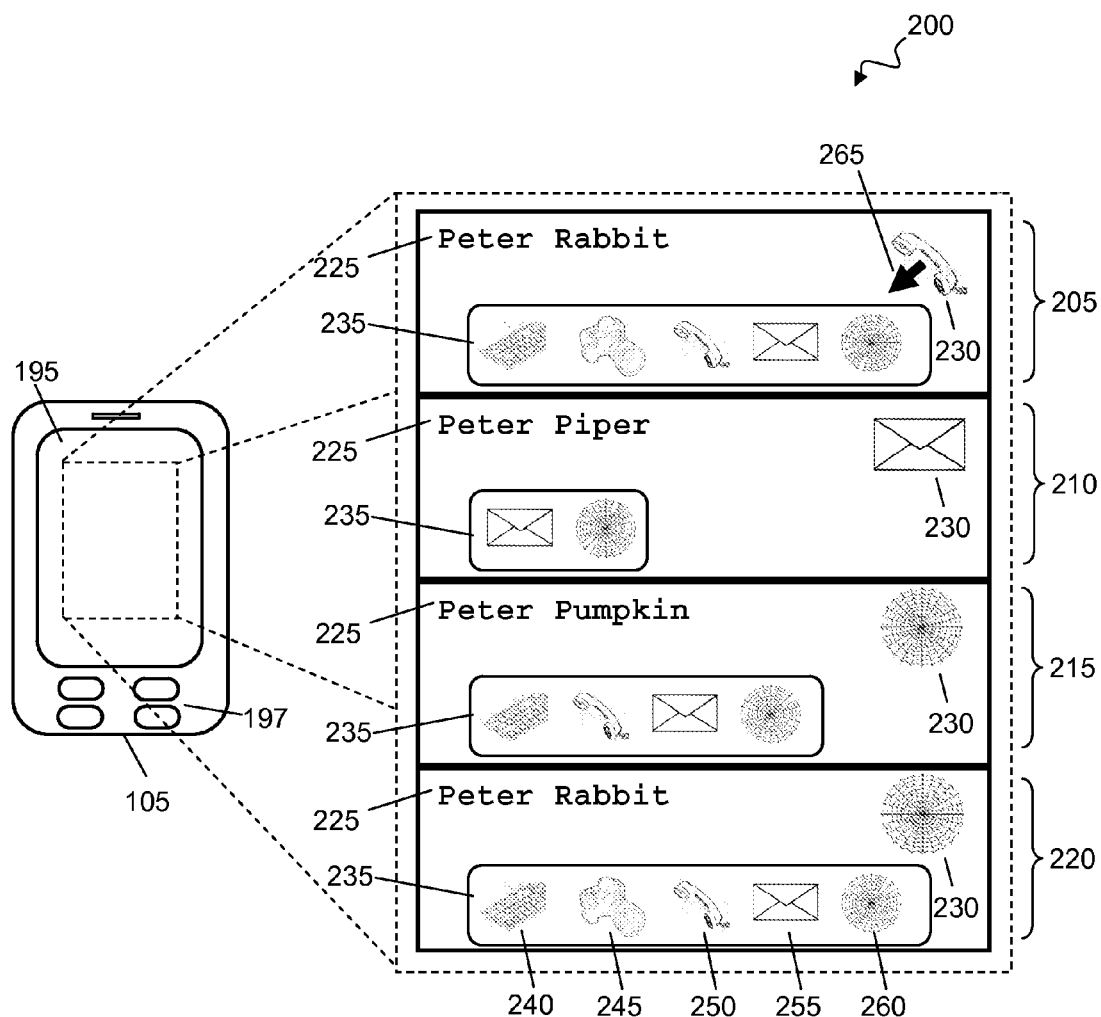
FIGS. 2-8 are schematic representations of implementations of social interaction hubs displayed on mobile devices.

FIG. 2 is a schematic representation of one implementation of a social interaction hub 200 displayed on mobile device 105. Social interaction hub 200 is displayed on all or a portion of display screen 195 and includes a collection of social interaction records 205, 210, 215, 220. Each social interaction record 205, 210, 215, 220 is a graphical element that includes indicia characterizing a social interaction event that has already occurred as well as indicia characterizing multiple modes by which a future, outgoing social interaction event can occur. In general, the future outgoing social interaction event will be related to the past social interaction event in that information will be exchanged between the same users.

In the illustrated implementation, social interaction records 205, 210, 215, 220 are arranged chronologically, e.g., in the vertically downward direction in the order in which they occurred regardless of the nature of the social interaction that they characterize. Thus, in the illustrated implementation, the outgoing telephone call event characterized in social interaction record 205 occurred before the electronic mail event characterized in social interaction record 210. In turn, the events characterized in both records 205, 210 occurred before the social network event characterized in social interaction record 215, which in turn occurred before the social network event characterized in social interaction record 220. In other implementations, social interaction records 205, 210, 215, 220 are arranged in accordance with one or more other parameters. For example, social interaction records 205, 210, 215, 220 can be arranged alphabetically or by the mode of the past social interaction event.

Each social interaction record 205, 210, 215, 220 includes an indicium 225 identifying the counterparty involved in a past social interaction event, an indicium 230 identifying the category of that past social interaction event, and a collection 235 of indicia identifying modes by which future, outgoing social interaction events can occur. Counterparty indicium 225 can be one or more of text (e.g., a person's name), a photo, a glyph, a telephone number, or other symbol identifying the involved counterparty. For example, in the illustrated implementation, counterparty indicium 225 in record 205 identifies that "Peter Rabbit" was the counterparty in the social interaction event characterized by record 205 whereas counterparty indicium 225 in record 210 identifies that "Peter Piper" was the counterparty in the social interaction event characterized by record 210.

Each category indicium 230 can be one or more of text, a photo, a glyph, or other symbol that identifies the mode of the past social interaction event. For example, in the illustrated implementation, category indicium 230 in record 205 identifies that the social interaction event characterized by record 205 was a telephone call. Category indicium 230 in record 210 identifies that the social interaction event characterized by record 210 was an electronic mail event. Category indicia 230 in records 215, 220 identify that the social interaction events characterized by records 215, 220 were postings on a social network. In some implementations, category indicia 230 identifying that social interaction events as postings on a social network can include, e.g., a logo or other identifier of the social network, as described further below.

In some implementations, social commerce interaction events can be identified by category indicia 230. Social commerce interaction events are commercial offers, or information about commercial offers, that are distributed directly from peer-to-peer rather than through, e.g., mass media. One example of a social commerce interaction event is a printable coupon or discount link that is forwarded from one individual to another. Another example of social commerce interaction event are events that are tailored for commerce that relies on near field communication for, e.g., mobile ticketing, mobile payment, and the like. Commercial offers, or information about commercial offers, that are recognized by near field communication devices can be exchanged between individuals. Such exchanges can be can be identified by category indicia 230 in social interaction hub 200.

In some implementations, social interaction hub 200 can be limited to records that characterize either incoming or outgoing past social interaction events. In other implementations, social interaction hub 200 can include records that characterize both incoming and outgoing social interaction events. In some implementations, the records can be limited to characterizing either incoming or outgoing social interaction events for some modes of social interaction but characterize both incoming and outgoing social interaction events for other modes of social interaction. For example, in some implementations, social interaction hub 200 can include records characterizing both incoming and outgoing telephone calls but only outgoing postings on a social network or outgoing electronic mail. This approach can help limit the characterization of social interaction events that occur very frequently, such as postings by others on a social network.

In some implementations, category indicia 230 can identify whether the past social interaction event was an incoming event or an outgoing event. For example, category indicium 230 in record 205 includes an arrow symbol 265 indicating that the past social interaction event characterized by record 205 was an outgoing telephone call rather than an incoming telephone call. Category indicia 230 can identify whether the past social interaction event was an incoming event or an outgoing event in a variety of way, including color, highlights, and other graphical devices.

In some implementations, social interaction hub 200 can exclude certain categories of social interaction events altogether. For example, social interaction hub 200 can exclude all text messages from characterization by a social interaction records. In other implementations, social interaction hub 200 can use a single record to characterize a group or a collection of events of the same category. For example, a chain of related electronic mail correspondence or a series of text messages exchanged with the same counterparty or counterparties can be characterized in a single record in social interaction hub 200.

In some implementations, social interaction hub 200 can be limited to social interaction events involving specified counterparties. For example, social interaction hub 200 can be limited to social interaction events involving a defined group of contacts, such as a user's social contacts.

Indicia collection 235 can include text, photos, glyphs, or other symbols that identify modes by which a future outgoing social interaction event can occur. The modes identified in each indicia collection 235 can be limited to the modes which are available for social interaction with the same counterparty identified by the person indicium 225 of that record. For example, indicia collection 235 in record 210 only identifies two modes which are available for social interaction with the counterparty "Peter Piper" identified by counterparty indicium 225 in that same record. As another example, indicia collection 235 in record 220 identifies five modes which are available for social interaction with the counterparty "Peter Rabbit" identified by counterparty indicium 225 in that same record. If a mode of interaction is not available for the counterparty identified by the person indicium 225, a mode indicium for that mode of interaction can be omitted.

In general, the indicia in indicia collection 235 are also interactive elements that allow a user to trigger social interaction with the counterparty identified by the person indicium 225 of that record via the identified mode. For example, a mobile device 105 can present graphical elements tailored for social interaction via the mode identified by an indicium or attempt to establish social interaction via the mode identified by an indicium in response to user interaction with that indicium.

Five different example mode indicia 240, 245, 250, 255, 260 are shown in the illustrated implementation. Each mode indicium 240, 245, 250, 255, 260 can identify a different mechanism by which users can interact socially. For example, in the illustrated implementation, the presence of mode indicium 240 in a collection 235 identifies that text messages are available for social interaction with the counterparty identified in that record. Mobile device 105 can, e.g., present a text entry screen or other modality for entering text messages in response to user interaction with mode indicium 240.

The presence of mode indicium 245 in a collection 235 identifies that a photosharing network is available for social interaction with the counterparty identified in that record. Mobile device 105 can, e.g., navigate to a website of the photosharing network in response to user interaction with mode indicium 245.

The presence of mode indicium 250 in a collection 235 identifies that the counterparty identified in that record can be telephoned. Mobile device 105 can, e.g., place a telephone call to a counterparty in response to user interaction with mode 250.

The presence of mode indicium 255 in a collection 235 identifies that the counterparty identified in that record can be electronically mailed. Mobile device 105 can, e.g., present a text entry screen or other modality for entering electronic mail messages in response to user interaction with mode indicium 255.

The presence of mode indicium 260 in a collection 235 identifies that a social network is available for social interaction with the counterparty identified in that record. Mobile device 105 can, e.g., navigate to a website of the photosharing network in response to user interaction with mode indicium 260.

In some implementations, the symbols used in mode indicia 240, 245, 250, 255, 260 can closely resemble the symbols used as category indicium 230. For example, mode indicia 240, 245, 250, 255, 260 can be identical to or resized and/or differently colored variants of various category indicia 230. Thus, in some implementations, mode indicia 240, 245, 250, 255, 260 identifying that a social network is available for social interaction can include, e.g., a logo or other identifier of the social network.

In the illustrated implementation, indicia collection 235 includes only one mode indicium for each category of social interaction. This is not necessarily the case. For example, mode indicia that identify different social networks which are available for social interaction with the same counterparty can be included in a single indicia collection 235. As another example, mode indicia that identify different telephone numbers which are available for social interaction with the same counterparty can be included in a single indicia collection 235.

As shown, unlike a call log on a cellular phone, the records in social interaction hub 200 are not constrained to characterizing only one or a limited number of different modes of social interaction. Instead, the records in social interaction hub 200 can characterize multiple modes of social interaction, including social network interaction. Further, the records in social interaction hub 200 are not constrained to characterizing social interaction that is implemented by a single data communication component. For example, in the context of mobile device 105 of system 100, social interaction hub 200 can characterize events that are implemented using a mobile phone transceiver and events that are implemented using a WiFi transceiver. The events characterized in a single social interaction hub 200 can be both direct social interaction events and server-mediated social interaction events.

Figure 3:
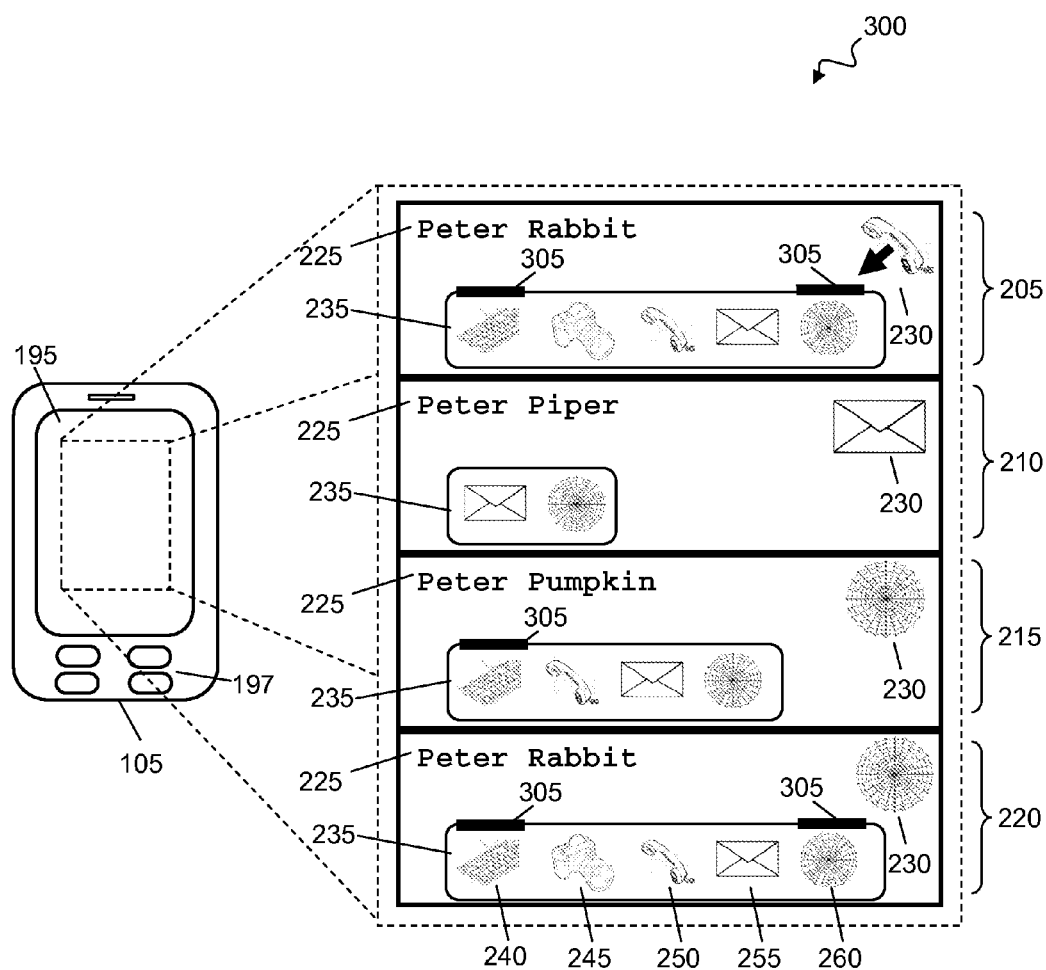

FIG. 3 is a schematic representation of an implementation of a social interaction hub 300 displayed on mobile device 105. In addition to features described in detail above, selected mode indicia 240, 245, 250, 255, 260 in indicia collections 235 are labeled with an availability indicator 305. Availability indicators 305 are graphical elements that indicate that the counterparties identified by indicia 225 in respective social interaction records are presently available for social interaction via the labeled mode. For example, an availability indicator 305 associated with a mode indicium 260 can indicate that a counterparty is presently logged in to and available on a social network. As another example, availability indicator 305 associated with a mode indicium 240 can indicate that a counterparty is presently online and available to exchange text messages.

Availability indicators 305 can label a mode indicium in a variety of ways. For example, availability indicators 305 can include a highlight, a color change, or other modification of a mode indicium itself. Availability indicators 305 can also be a separate graphical element that labels a mode indicium by virtue of positioning relative to the mode indicium, as is the case for the over-line availability indicators 305 in the illustrated implementation.

In some implementations, availability indicators 305 can indicate that a counterparty is not presently available for social interaction via a labeled mode. For example, a mode indicium can be modified, e.g., by darkening to indicate that the a counterparty is not presently available for social interaction via that mode.

Figure 4:
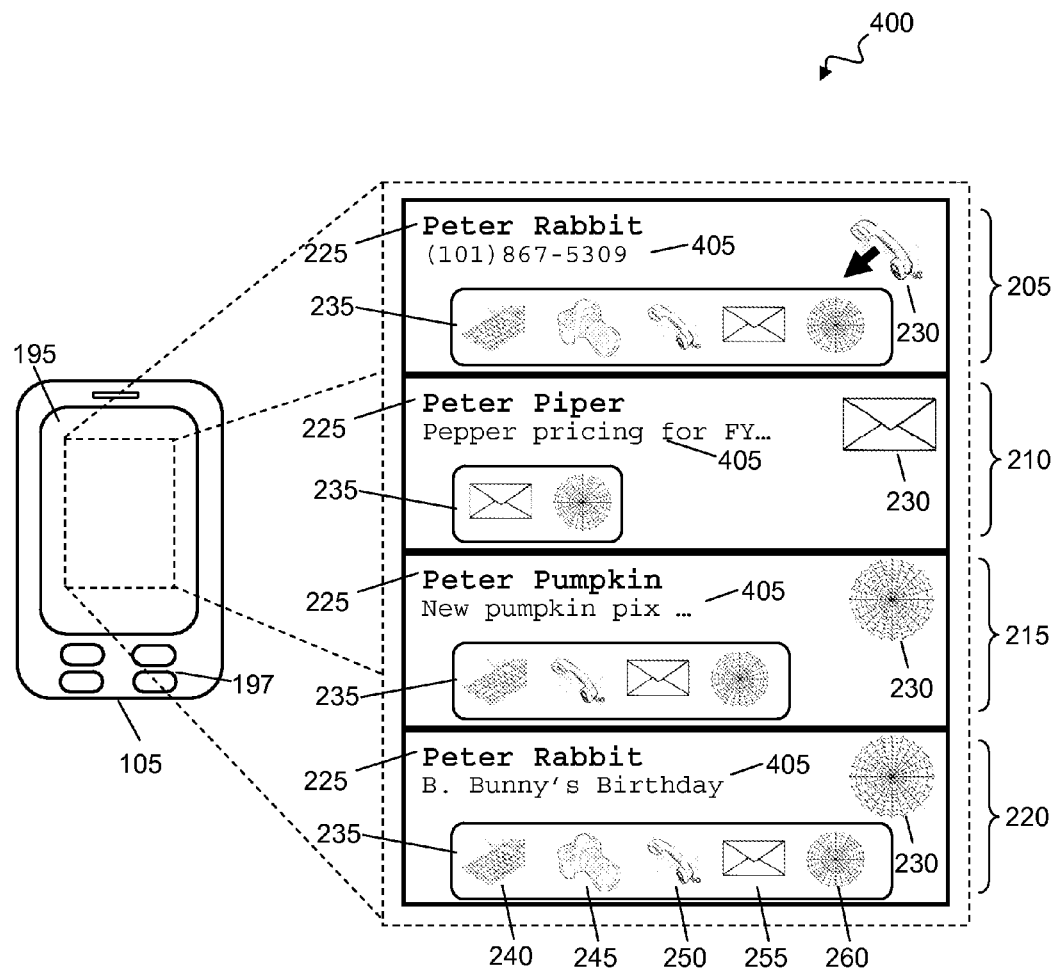

FIG. 4 is a schematic representation of an implementation of a social interaction hub 400 displayed on mobile device 105. In addition to features described in detail above, each social interaction record 205, 210, 215, 220 includes an description 405 of the subject of the past social interaction event characterized in that record. Subject descriptions 405 can include text or other graphical element that describes the past social interaction event. Descriptions 405 can be, e.g., the subject line of an electronic mail, an excerpt or other "peek" from a text message, text accompanying a photograph posted on a photo sharing website, or an excerpt or other "peek" from a posting on a social network.

Figure 5:
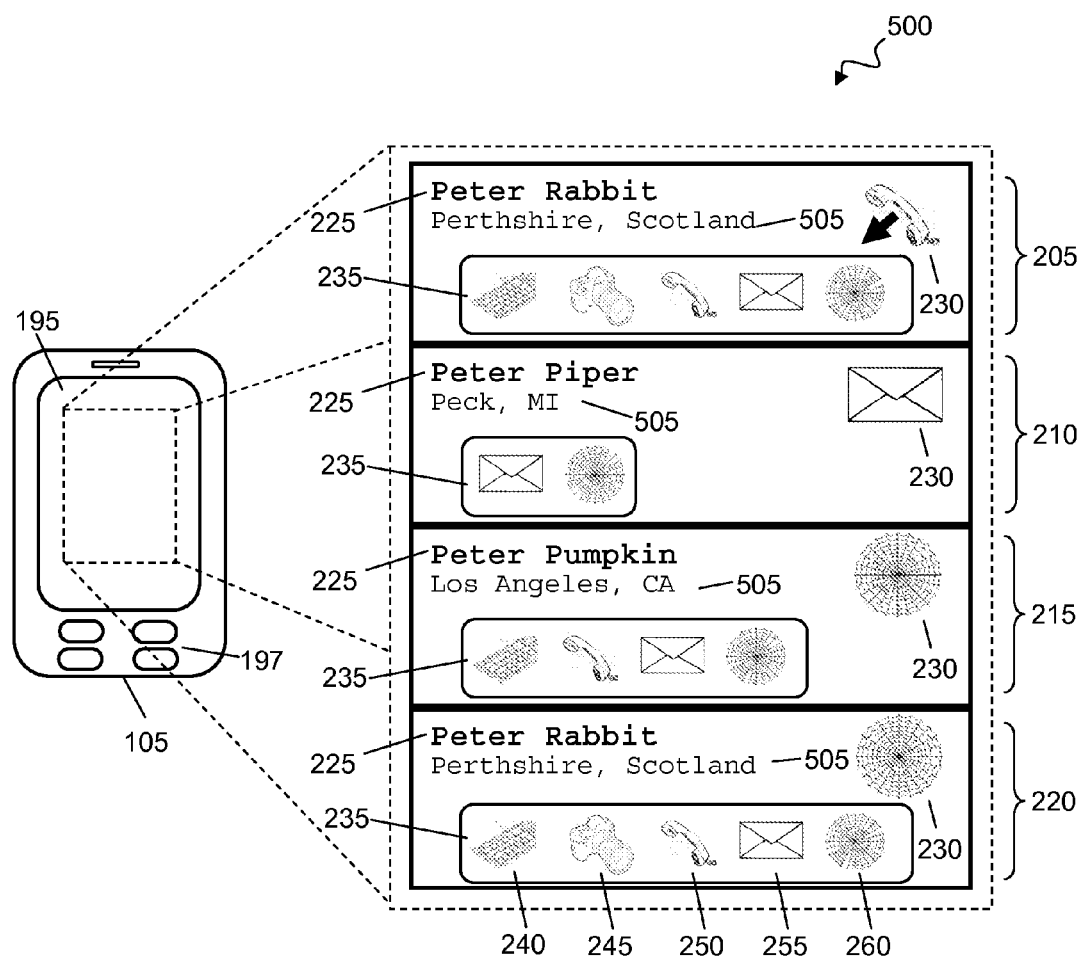

FIG. 5 is a schematic representation of an implementation of a social interaction hub 500 displayed on mobile device 105. In addition to features described in detail above, each social interaction record 205, 210, 215, 220 includes an description 505 of a location of a counterparty of the past social interaction event characterized in that record. Location descriptions 505 can include text or other graphical element that describes either the present location of the counterparty or a "home" or other default location of the counterparty. In some implementations, the location which is characterized depends upon whether present location information is available. For example, a counterparty may post the counterparty's present location to a social network. If such a posting is available, then location descriptions 505 in one or more interaction records 205, 210, 215, 220 that describe social interaction events with that counterparty can describe that present location. However, in the absence of such a posting or other source of information, then such location descriptions 505 can describe a default location of the counterparty.

Figure 6:
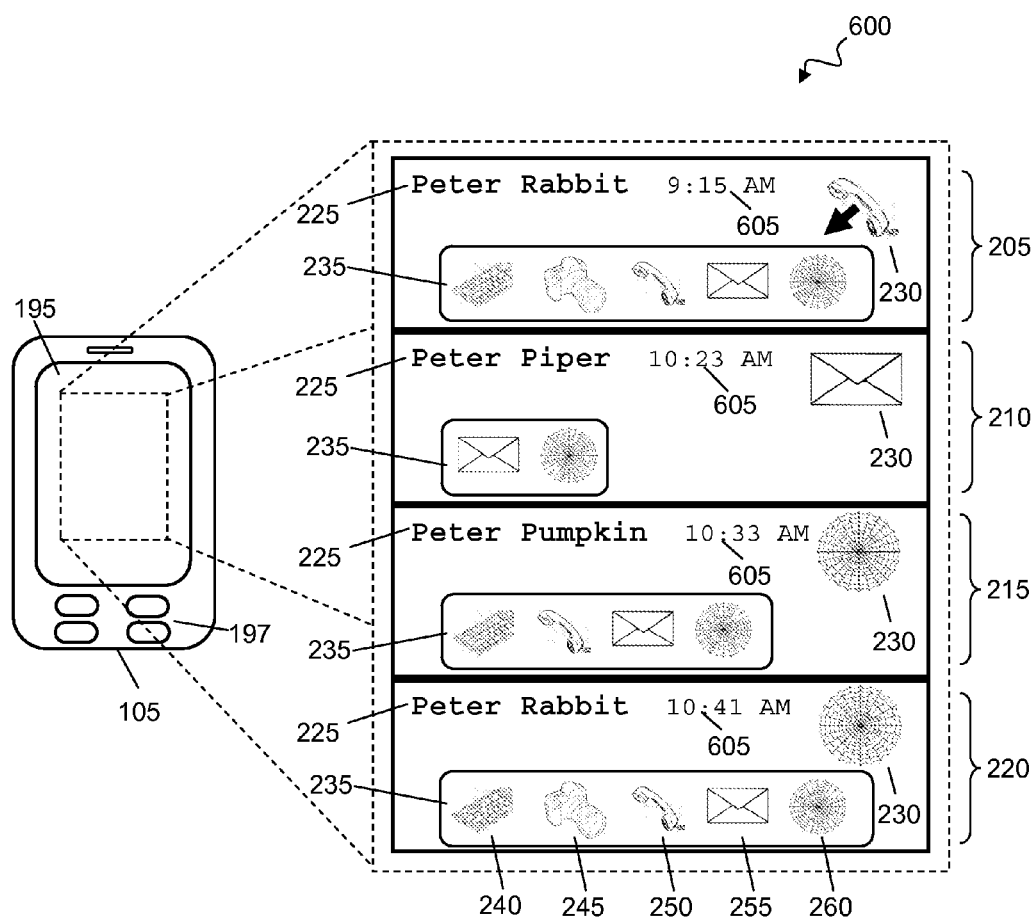

FIG. 6 is a schematic representation of an implementation of a social interaction hub 600 displayed on mobile device 105. In addition to features described in detail above, each social interaction record 205, 210, 215, 220 includes an description 605 of the time when the past social interaction event characterized in that record occurred. Time descriptions 605 can include text or other graphical element that describes the time when the past social interaction event characterized in the same social interaction record 205, 210, 215, 220 occurred.

Figure 7:
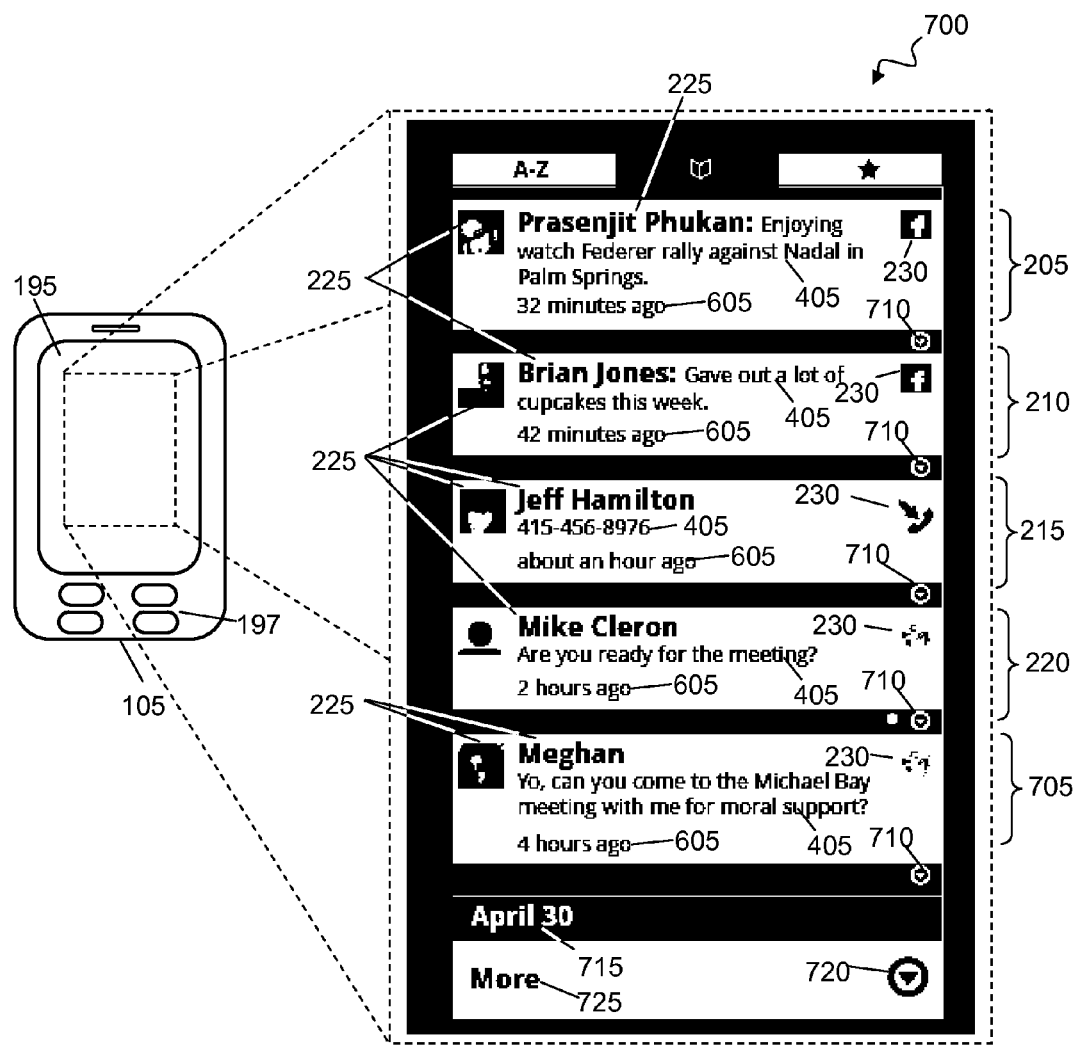
Figure 8:
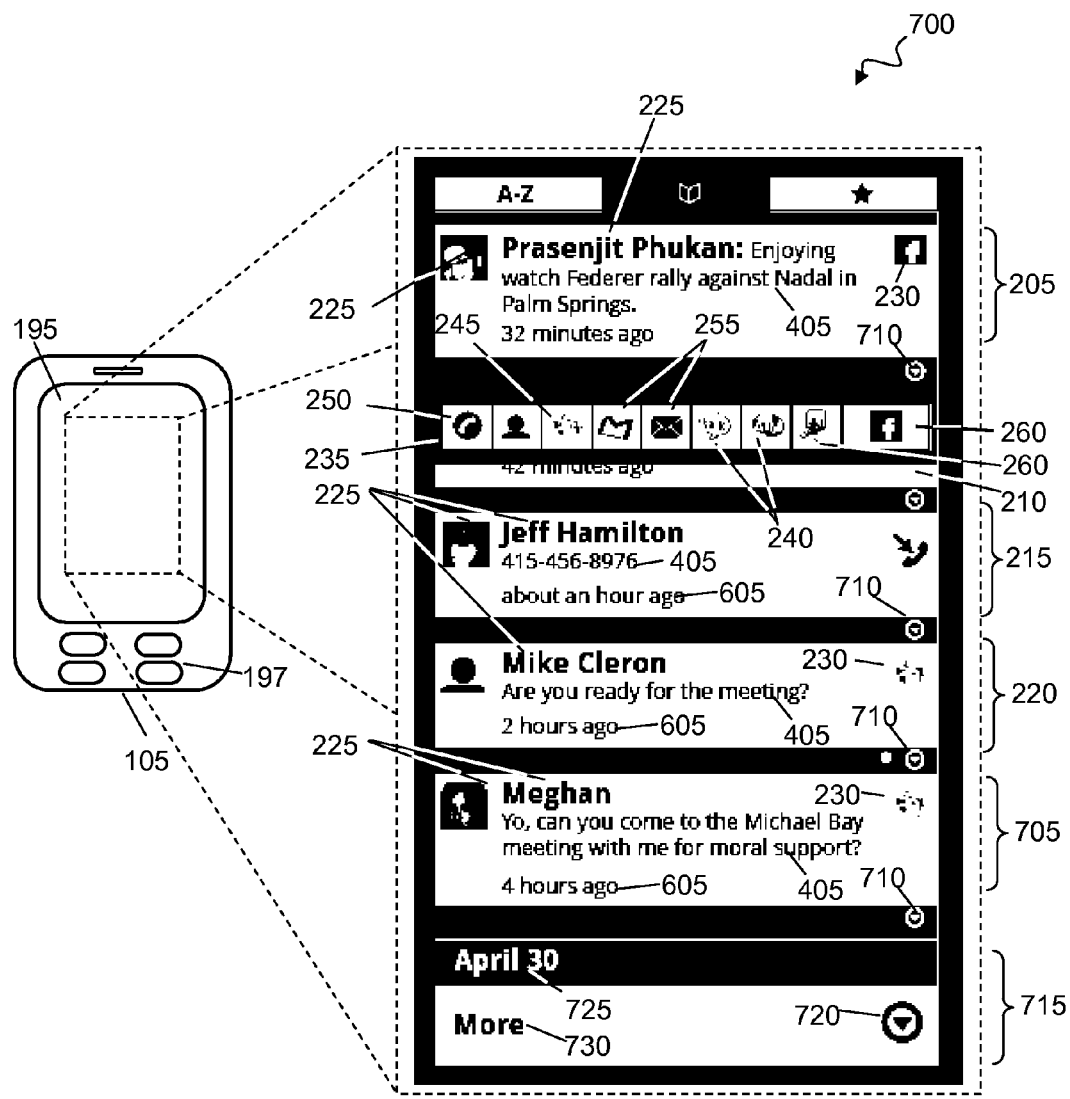

FIGS. 7 and 8 are schematic representations of an implementation of a social interaction hub 700 displayed on mobile device 105. In addition to features described in detail above, social interaction hub 700 includes another interaction record 705 and interaction records 205, 210, 215, 220, 705 each include a widget 710. Widgets 710 are interactive graphical elements. User interaction with widgets 710 triggers the display of the indicia collection 235 that identifies modes by which a future, outgoing social interaction events can occur with the counterparty identified in the interaction record associated with the widget 710. The display of one indicia collection 235 in response to user interaction with the widget 710 associated with social interaction record 205 illustrated in FIG. 8.

Indicia collections 235 thus need not be displayed continuously for every interaction record 205, 210, 215, 220, 705. Rather, selected indicia collections 235 are only displayed in response to the receipt of a user's indication that display of the selected indicia collection 235 is desired. Accordingly, interaction hub 700 can be made relatively smaller and the limited display area of mobile device 105 used for other ends.

Social interaction hub 700 also includes a navigation area 715. Navigation area 715 includes one or more navigation widgets 720 and descriptive information 725, 730 that facilitate navigation to additional social interaction records. Information 725 describes the disposition of the currently displayed social interaction records within a larger collection of social interaction records. In the illustrated implementation, information 725 identifies the date on which the events described in the displayed social interaction record 205, 210, 215, 220, 705 occurred (i.e., April 30th). In other implementations, the disposition of the currently displayed social interaction records can be described according to the number of social interaction records in a particular group of social interaction records, or the like. Information 730 describes that navigation area 715 is indeed a navigation area that can be used to navigate to "more" social interaction records. Navigation widget 720 is an interactive graphical element that allows a user to trigger the display of additional social interaction records. In some implementations, navigation widget 720 can include a graphical or other indicia that identifies the social interaction records which will be displayed in response to user interaction with navigation widget 720. For example, in the illustrated implementation, navigation widget 720 includes a triangle which is oriented downward. In the context of the chronological organization of social interaction record 205, 210, 215, 220, 705 within the illustrated implementation of social interaction hub 700, the triangle identifies that social interaction records which characterize events which occurred before the events characterized in social interaction record 205, 210, 215, 220, 705 will be displayed in response to user interaction with navigation widget 720.

Figure 9:
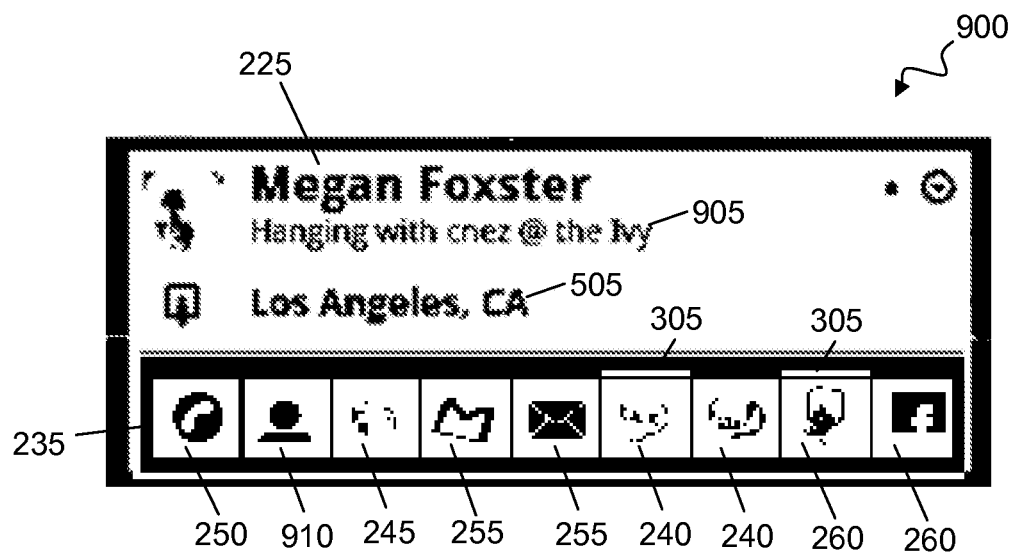
FIG. 9 is a schematic representation of an implementation of a social status record suitable for display on a mobile device.

FIG. 9 is a schematic representation of an implementation of a social status record 900 suitable for display on a mobile device. Social status record 900 is a graphical element that includes one or more status indicia 905 characterizing the status of a counterparty with whom the user interacts. The status of a counterparty is a state or a condition of the counterparty. Status indicia 905 can include text or other graphical elements that characterize a counterparty's status. In some implementations, the content of a status indicium 905 can be derived from one or more modes that are available for social interaction with the counterparty, such as a social network or a text messaging network. For example, in the illustrated implementation, status indicium 905 is derived from a the counterparty's GOOGLE TALK™ status.

In the illustrated implementation, social status record 900 includes a counterparty indicium 225, an indicia collection 235, availability indicators 305, and a location description 505, in addition to status indicia 905. In other implementations, social status record 900 can omit one or both of availability indicators 305 and a location description 505. In some implementations, social status record 900 can include a widget 710 that triggers the display of the indicia collection 235.

In some implementations, social status record 900 can include a description of the time when the content of status indicia 905 was last confirmed as valid. For example, the time at which a status update was posted on a social or a chat network can be taken as the time when the counterparty's status was last confirmed as valid.

In some implementations, one or more social status records 900 can be collected into a social interaction hub that is limited to social status records 900. The display of a mobile device 105 can present a social interaction hub that is limited to social status records and a social interaction hub that is limited to social interaction records at the same time or one at a time, e.g., in response to triggers received from a user. In other implementations, a single social interaction hub can include one or more social status records 900 as well as one or more social interaction records. For example, one or more social interaction records 900 can be included in one or more of social interaction hubs 200, 300, 400, 500, 600, 700 (FIGS. 2-8) and presented on mobile device 105.

Social status records 900 can be arranged in a social interaction hub chronologically, e.g., in the vertically downward direction in the order in which the content of status indicia 905 was last confirmed as valid. In implementations where social status records and social interaction records appear in the same social interaction hub, the times when status was last confirmed as valid can be compared with the times when social interaction events last occurred and the corresponding record arranged chronologically.

In some implementations, the social status records 900 that are presented in any social interaction hub can be limited to specified counterparties. For example, social status records 900 can be limited to a defined group of contacts, such as a user's social contacts.

In the illustrated implementation of social status record 900, indicia collection 235 includes a contact indicium 910. Contact indicium 910 is an interactive graphical element that allows a user to navigate to additional information regarding the counterparty identified by counterparty indicium 225. For example, in response to user interaction with contact indicium 910, mobile device 105 can, e.g., present a contact card or other assembly of information characterizing the counterparty. As illustrated in FIGS. 7, 8, social interaction records can also include a contact indicium 910, e.g., disposed within indicia collection 235.

Figure 10:
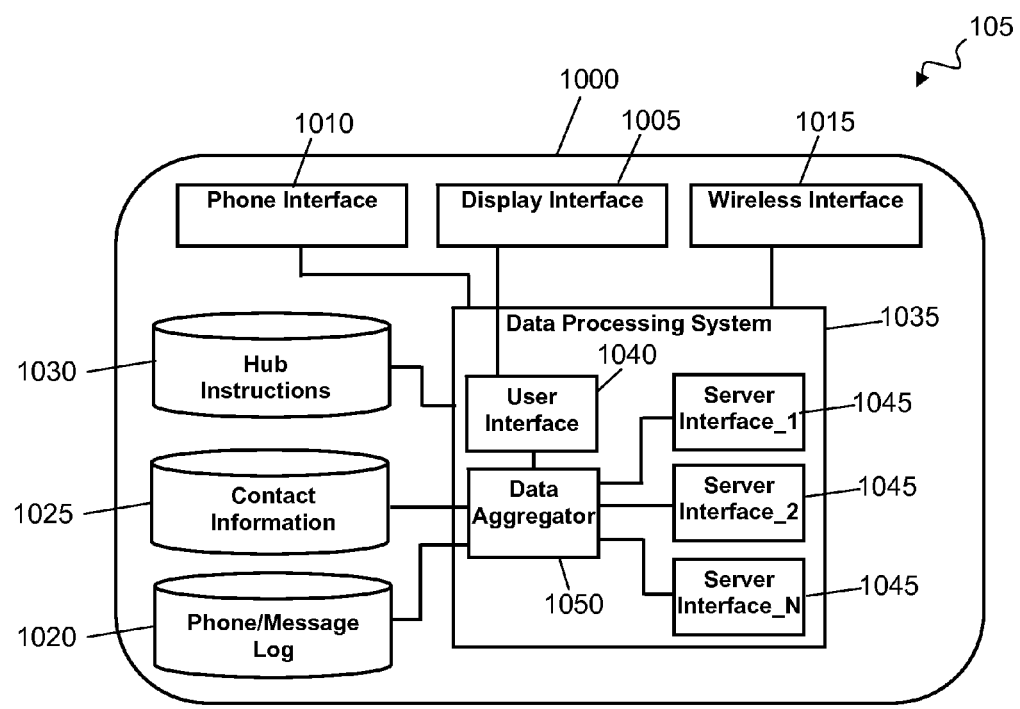
FIGS. 10, 11, and 13 are schematic representations of collections of components of mobile devices.

FIG. 10 is a schematic representation of a collection 1000 of components of a mobile device 105. Collection 1000 can include both hardware and software components, as well as one or more data storage devices and one or more data processors that perform operations for presenting a social interaction hub on display screen 195 of a mobile device 105. For example, collection 1000 can present one or more of social interaction hubs 200, 300, 400, 500, 600, 700 (FIGS. 2-8) or a social interaction hub that is limited to social status records on a mobile device 105.

Collection 1000 includes a display interface 1005, a phone interface 1010, an interface 1015 with a wireless transceiver, a collection of data stores 1020, 1025, 1030, and a data processing system 1035. Display interface 1005 is a component that interfaces between data processing system 1035 and display screen 195. Display interface 1005 can include hardware and/or software that provide a data communication path and defines a data communication protocol for the transfer of image and user interaction information between data processing system 1035 and display screen 195. Display interface 1005 can include one or more of a graphic processing unit, a video display controller, a video display processor, or other display interface.

Phone interface 1010 is a component that interfaces between data processing system 1035 and a cellular or other phone. Phone interface 1010 can include hardware and/or software that provide a data communication path and define a data communication protocol for the transfer of information between data processing system 1035 and the phone.

Wireless interface 1010 is a component that interfaces between data processing system 1035 and a wireless transceiver. Phone interface 1010 can include hardware and/or software that provide a data communication path and define a data communication protocol for the transfer of information between data processing system 1035 and the wireless transceiver.

Data stores 1020, 1025, 1030 are one or more collections of machine-readable information stored at one or more data processors. Data store 1020 stores a phone and message log that stores information describing past social interaction events that have occurred by telephone and text messaging. Data store 1020 can include, e.g., information characterizing the counterparty (e.g., a telephone number) and information characterizing the timing of the past social interaction events. In some implementations, data store 1020 only stores information describing direct social interaction events, e.g., that occurred over phone interface 1010 and a cellular or other phone.

Data store 1025 stores a collection of contact information that characterizes counterparties with whom social interaction can occur. Among the contact information that can be stored at data store 1025 is information for establishing different modes of social interaction. For example, data store 1025 can include information characterizing counterparty's home and work telephone numbers, information characterizing a counterparty's home page or other contributions to a social networking site or a photosharing site, information characterizing one or more electronic mail, instant message, or other messaging addresses of a counterparty, as well as other information such as postal address information, a photograph, and the like.

In some implementations, data store 1025 can also include grouping information characterizing groups of counterparties. As described above, in some implementations, a social interaction hub can be limited to social interaction with a specified group of individuals. Such a group of individuals can be specified by grouping information in data store 1025.

Data store 1030 stores one or more sets of machine-readable instructions for creating a social interaction hub. When implemented by one or more data processors, the instructions can cause the implementing data processors to aggregate data and present a social interaction hub on display screen 195.

Data processing system 1035 is one or more digital data processors that perform operations in accordance with the logic of one or more sets of machine-readable instructions. Data processing system 1035 can implement one or more modules for performing operations for presenting a social interaction hub on display screen 195 in accordance with the logic of such instructions. Among the modules that can be implemented by data processing system 1035 are a user interface module 1040, a variety of different server interface modules 1045, and a data aggregation module 1050.

User interface module 1040 is a set of data processing activities that prepare instructions for presenting a social interaction hub on display screen 195. User interface module 1040 can, e.g., select the particular data which is to be displayed in a particular social interaction and respond to user interaction with the displayed social interaction hub.

Server interface modules 1045 are sets of data processing activities that interface with social interaction servers, such as servers 155, 160, 165, 170 (FIG. 1). In general, each server interface modules 1045 is dedicated to obtaining information suitable for presentation in a social interaction hub from a different social interaction server. Server interface modules 1045 can be, e.g., an electronic mail or message clients, as well as dedicated clients tailored to the characteristics of a specific social or photosharing network.

The server interface modules 1045 can obtain information for presentation in a social interaction hub, e.g., by issuing service requests to a social interaction server and extracting the formation from the responses to those requests. The requests and responses are communicated from mobile device 105 to the relevant social interaction server over one or both of interfaces 1010, 1015. The information extracted from the responses to the service requests can include, e.g., incoming electronic mail and text messages, the log-in status of a counterparty (e.g., for presentation of availability indicators 305), a name or other identifier of counterparty involved in a past social interaction, an excerpt or other peek from a posting on a photosharing or social network site (e.g., for presentation of subject descriptions 405), a counterparty's location from, e.g., a social network site (e.g., for presentation of location descriptions 505), and timing information (e.g., for presentation of time descriptions 605).

Data aggregation module 1050 is a set of data processing activities that aggregates information drawn from phone/message log 1020, contact information 1025, and server interfaces 1045 for presentation of that information in a social interaction hub. In some implementations, data aggregation module 1050 compares the names or other identifiers of counterparties involved in a past social interaction event with names or other identifiers information associated with information drawn from phone/message log 1020, contact information 1025, and server interfaces 1045 and aggregate information associated with the same identifier for a social interaction event record characterizing that past social interaction event. Data aggregation module 1050 can also compare names or other identifiers of counterparties in information drawn from phone/message log 1020, contact information 1025, and server interfaces 1045 to aggregate information for social status records.

In general, data aggregation module 1050 includes rules for filtering the social interaction events which are characterized in a social interaction hub or the counterparties for whom social status records are presented. As described above, the past social interaction events characterized in a social interaction hub can be limited in several different ways, including whether the past event was an incoming or outgoing social interaction event, whether the past event was direct or server-mediated, or whether the past event involved a specified counterparty. Data aggregation module 1050 can filter social interaction events to implement these and other limitations.

In some implementations, data aggregation module 1050 can also include conflict resolution activities for resolving conflicts between information drawn from phone/message log 1020, contact information 1025, and server interfaces 1045. For example, a counterparty may be identified as residing at a first location in contact information 1025 but at a second location in a social network server. Data aggregation module 1050 can resolve the conflict between contact information 1025 and the social network server based on, e.g., the last time information on either was updated or a user indication that one is to be relied upon for presentation of location descriptions 505.

In some implementations, data aggregation module 1050 can also include extraction rules for extracting appropriate information for presentation fro, e.g., electronic mail and text messages, phone and message log 1020, and the responses to service requests received by server interfaces 1045. For example, data aggregation module 1050 can extract the subject line of electronic mail messages or a title of a posting on a photosharing or social network for presentation of subject descriptions 405.

In some implementations, data aggregation module 1050 can also include rules for collapsing a chain of electronic mail or text messages or other social interaction events into a single social interaction event. For example, data aggregation module 1050 can compare the subject line of electronic mail messages to identify a chain of related electronic mail messages. Data aggregation module 1050 can then aggregate those messages so that a single social interaction event record characterizing them all is presented.

Figure 11:
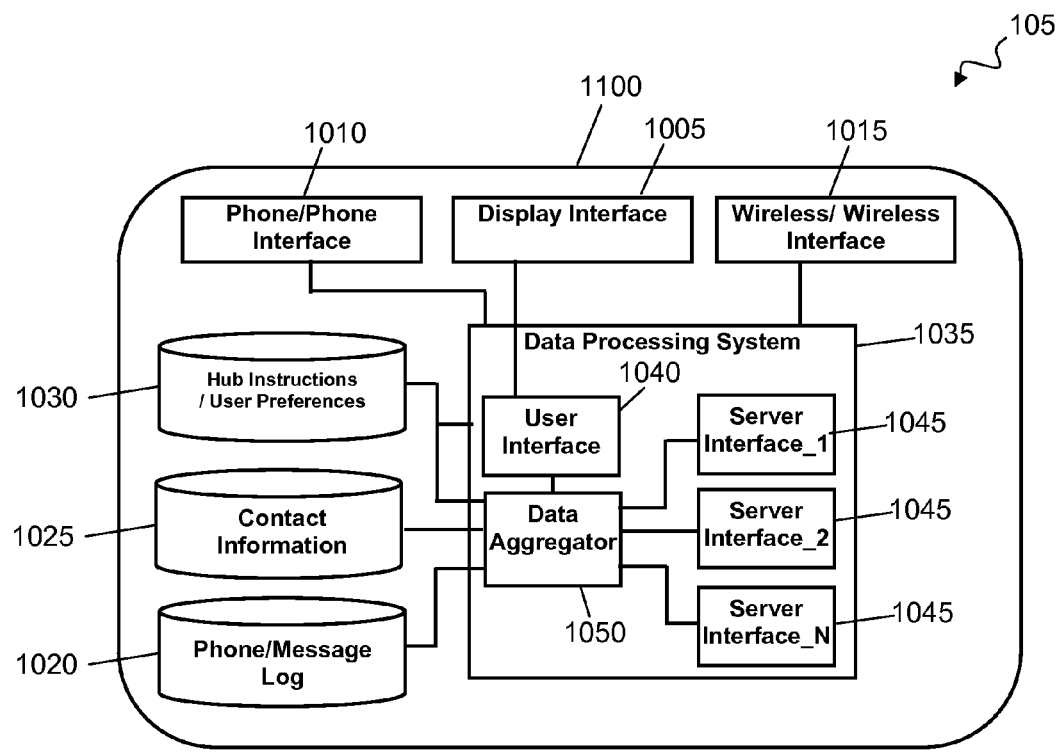

FIG. 11 is a schematic representation of a collection 1100 of components of a mobile device 105. Collection 1100 can include both hardware and software components, as well as one or more data storage devices and one or more data processors that perform operations for presenting a social interaction hub on display screen 195 of a mobile device 105. For example, collection 1100 can present one or more of social interaction hubs 200, 300, 400, 500, 600, 700 (FIGS. 2-8) or a social interaction hub that is limited to social status records on a mobile device 105.

In addition to the components described above, data store 1030 of collection 1100 also stores one or more sets of user preference information. The user preference information in data store 1030 specifies user preferences for the presentation of a social interaction hub on display screen 195. For example, the user preference information can specify limitations on the counterparties who are characterized in social status records. As another example, the user preference information can specify limitations on the past social interaction events that are characterized in a social interaction hub, including whether the past event was an incoming or outgoing social interaction event, whether the past event was direct or server-mediated, or whether the past event involved a specified counterparty.

FIG. 12 is a schematic representation of a collection 1200 of user preference information that specifies limitations on the characterization of past social interaction events in a social interaction hub.

In the illustrated implementation, collection 1200 is implemented in a data table 1205. Data table 1205 organizes user preference information into rows 1210, 1215, 1220, 1225, 1230 and columns 1235, 1240, 1245, 1250, 1255, 1260, 1265, 1270, 1275, 1280, 1285. Each row 1210, 1215, 1220, 1225, 1230 is associated with a counterparty or group of counterparties. Each column 1235, 1240, 1245, 1250, 1255, 1260, 1265, 1270, 1275, 1280, 1285 includes data specifying limitations on the past social interaction events that are characterized in a social interaction hub. The limitations specify that past social interaction events are not to be characterized in a social interaction event record.

In the illustrated implementation, the data in columns 1260, 1265 specify that social interaction events which occurred on a first social network are not to be characterized in a social interaction event record for the counterparties associated with rows 1210, 1215, 1225, 1230. In contrast, the data in columns 1260, 1265 also specify that both incoming and outgoing social interaction events which occurred on that same first social network are t to be characterized in social interaction event records for the counterparties in the group associated with rows 1220. For example, the group associated with rows 1220 may be a user's immediate family and the user may desire that a social interaction hub exhaustively present all social interaction event involving those family members.

Figure 13:
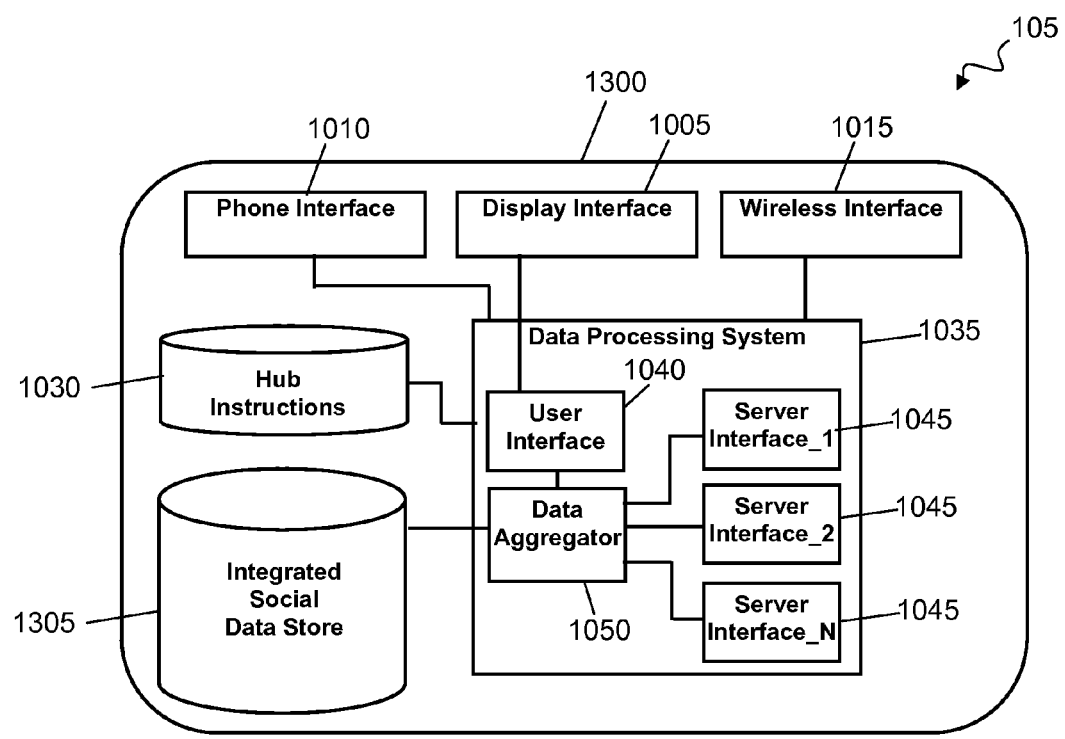

FIG. 13 is a schematic representation of a collection 1300 of components of a mobile device 105. Collection 1300 can include both hardware and software components, as well as one or more data storage devices and one or more data processors that perform operations for presenting a social interaction hub on display screen 195 of a mobile device 105. For example, collection 1300 can be used present one or more of social interaction hubs 200, 300, 400, 500, 600, 700 (FIGS. 2-8) or a social interaction hub that is limited to social status records on a mobile device 105.

In addition to many of the components described above, collection 1300 includes an integrated social information data store 1305. Integrated social information data store 1305 is a database or other data store that integrates the storage of information characterizing contacts and information characterizing social interaction events that had occurred by a variety of different social interaction modes. For example, integrated social information data store 1305 can store information characterizing all of the different social interaction modes by which the user of a mobile device 105 can interact with his or her contacts in a single integrated database.

Figure 14:
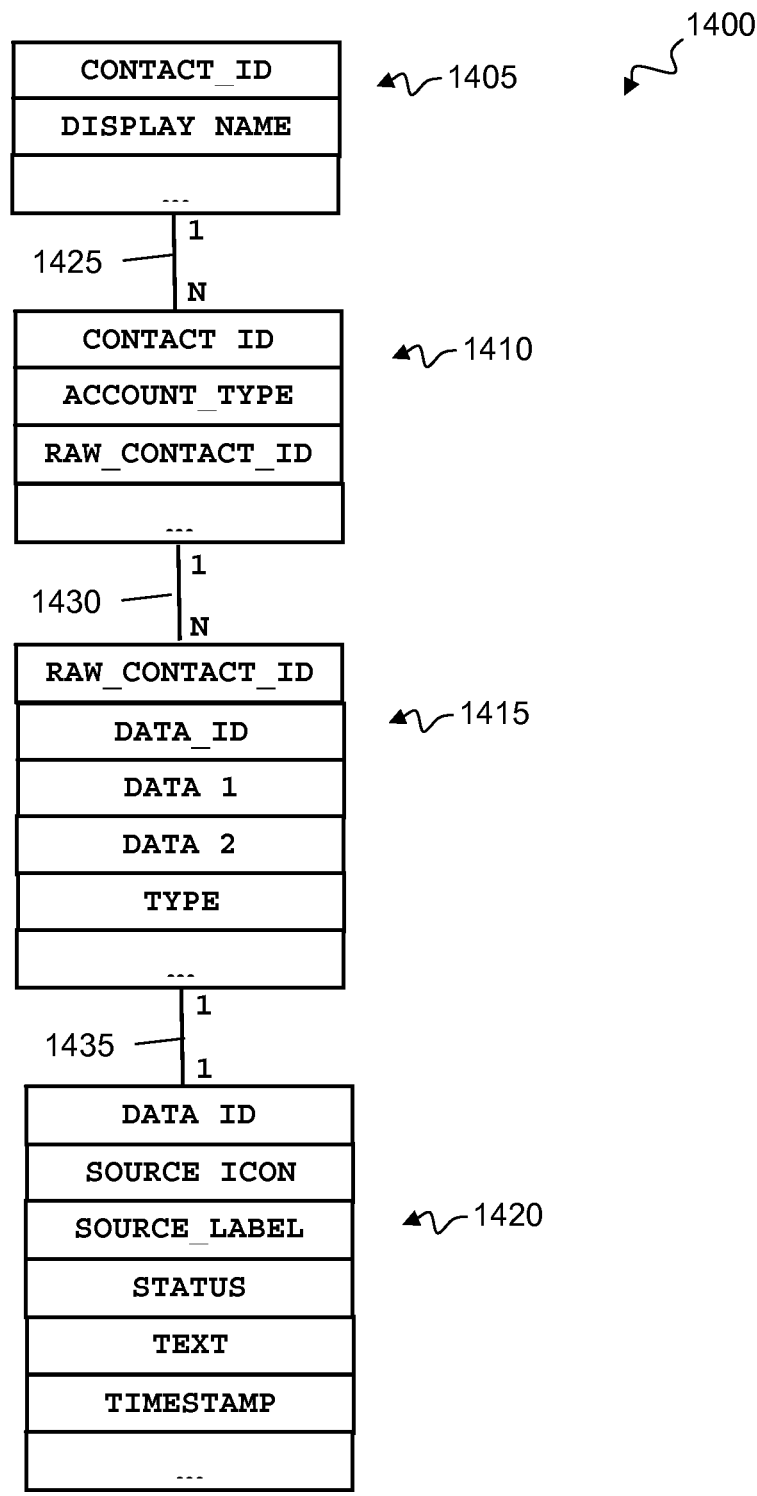
FIG. 14 is an example of a database schema of an integrated social information data store.

FIG. 14 is an example of a database schema 1400 of integrated social information data store 1305. Database schema 1400 represents an extensible database of contact-related information and includes a contacts class 1405, a raw contact class 1410, a contact data class 1415, and a status update class 1420. Contacts class 1405 has a one-to-many relationship 1425 with raw contact class 1410. Raw contact class 1410 has a one-to-many relationship with contact data class 1415. Contact data class 1415 has a one-to-one relationship with status update class 1420.

Contacts class 1405 is a class that stores information characterizing contacts. Contacts are individuals who may be counterparties in one or more social interaction events. Information can be stored in instances of contacts class 1405 by data aggregator 1050. In some implementations, each of multiple rows in a data table can be dedicated to storing information characterizing each such individual and form separate instances of contacts class 1405.

In some implementations, the information characterizing contacts that is stored in contacts class 1405 is limited, with contacts class 1405 essentially storing only a numeric or other unique identifier and links to instances of raw contacts class 1410 that can be combined and presented as a single logical person. For example, in the illustrated implementation, contacts class 1405 includes a numeric or other unique identifier of the contact (i.e., the "contact_ID" field shown in FIG. 14), a name or other textual identifier of the contact (i.e., "display_name"), and any links to instances of raw contacts class 1410.

In some implementations, contacts class 1405 includes a predefined set of data kinds for characterizing contacts and additional data kinds that are added, e.g., by different applications. The set of data kinds that can be stored in contacts class 1405 can thus in some implementations be open-ended.

Raw contact class 1410 is a class that stores information characterizing a "raw contact" from a single account of the user with whom mobile device 105 is associated. An account is the result of a contractual or other arrangement between the user with whom mobile device 105 is associated and an entity. The entity can be an entity that mediates social interaction. For example, the user with whom mobile device 105 is associated may have an electronic mail account with the provider of an electronic mail server 155, a social network account with the provider of a social network server 160, a text message account with the provider of a text message server 165, or a photo account with the provider of a photo server 170 (FIG. 1).

As used herein, a "raw contact" is a representation of an individual (i.e., the contact) at an account of the user with whom mobile device 105 is associated. The individual can be a counterparty to past social interaction events or otherwise identified as associated with the user with whom mobile device 105 is associated. For example, "raw contacts" in the context of a social network can be individuals who are friends of the user with whom mobile device 105 is associated or those individuals who are followed by the user with whom mobile device 105 is associated. As another example, a "raw contact" in the context of an electronic mail account can be individuals whose contact information is saved in the electronic mail account or individuals whom are commonly mailed by the user with whom mobile device 105 is associated.

At times, a single real-world individual may be represented by multiple instances of raw contact class 1410. For example, the user with whom mobile device 105 is associated may have the same person as a contact in an electronic mail system and as a friend in two different social networks. In this case, the same person could be represented by three different instances of raw contact class 1410. As discussed above, each instance of contacts class 1405 can include links to such multiple instances of raw contact class 1410 and such multiple instances of raw contact class 1410 can be combined and presented as a single logical person.

In some implementations, a row in a data table can be dedicated to storing information characterizing each instance of a raw contact. Among the information characterizing a raw contact that may be stored in raw contact class 1410 are a numeric or other unique identifier of the individual (i.e., "contact_ID"), a numeric or other unique identifier of the category of the account in which the individual is represented (i.e., "account_type"), a numeric or other unique identifier of the raw contact class instance (i.e., "raw_contact_ID"), the name of the account (i.e., electronic mail address, telephone number, social network account name, or the like), an indication of the number of times the individual has been contacted using the account, an indication of the last time the individual had been contacted using the account, an indication of whether a custom ringtone is associated with the representation of the individual in the account, and the like. In some implementations, the category of the account is constrained to follow a naming convention, e.g., the JAVA package naming convention. Such a constraint can help ensure that duplicate accounts can be identified and aggregated.

In general, raw contact class 1410 is indexed on a numeric or other unique identifier of the individual (i.e., the "contact_ID") so that multiple raw contacts that represent the same real-world individual in different accounts can be identified quickly. Further, in some implementations, raw contact class 1410 is also indexed on account type and account name so that multiple raw contacts from a single account source can be identified quickly.

Contact data class 1415 is a class that stores data points from raw contacts characterized in instances of raw contact class 1410. In some implementations, each row in a data table can form an instance of contact data class 1415 that is dedicated to storing a single piece of information drawn from a raw contact (such as a phone number or electronic mail address) and its associated metadata (such as what type of data is stored, whether it is a work or home number, and the like). Among the information that may be stored in contact data class 1415 are a numeric or other unique identifier of the raw contact class instance that is characterized (i.e., "raw_contact_ID"), a numeric or other unique identifier of the contact data class instance (i.e., "data_ID"), generic fields that can hold a variety of different kinds of contact data (e.g., "data_1" and "data_2") and type data that identifies the type of contact data stored in each generic field (e.g., "type"). For example, the type data can indicate that a generic field stores a phone number, an electronic mail addresses, an account in a social or photo network, or the like. The data types are generally constrained to a predefined set of types. For example, in some implementations, the data types can be constrained to being Multipurpose Internet Mail Extensions (MIME) data types. By constraining the data types predefined set of types, mobile device 105 can determine how to display data points drawn from different raw contacts. For example, different phone numbers drawn from different accounts can be recognized as such and displayed accordingly.

In some implementations, contact data class 1415 includes a predefined set of data kinds and additional data kinds that are added, e.g., by different applications. The set of data kinds that can be stored in contacts class 1405 can thus be open-ended. Such additional data kinds can also be the subject of requests and responses between a corresponding server interface module 1045 and its server.

In some implementations, first generic fields (e.g., "data_1") form an indexed column in a contact data class table and store data that is expected to be frequently used in database queries. For example, in the case of a row representing an electronic mail address, the first generic field can generally include the electronic mail address itself. Other generic fields can store auxiliary information that characterizes the data in the first generic field, such as whether the electronic mail address stored in the first generic field is a home or business electronic mail address.

Status update class 1420 is a class that stores a contact's latest status updates from a corresponding raw contact characterized in raw contact class 1410. Among the information that may be stored in status update class 1420 are a numeric or other unique identifier of the contact data class instance that is characterized in the status update class instance (i.e., "data_ID"), a uniform resource identifier (URI) or other identifier of a storage location of an icon that represents the entity with which the contact has the corresponding account (i.e., "source_icon"), a uniform resource identifier (URI) or other identifier of a storage location of a name or other label identifying the entity with which the contact has the corresponding account (i.e., "source_label"), a numeric or other identify of the contact's latest status (i.e., "status"), any text of the status update (e.g., "text"), and a timestamp when status was last updated by the contact at the corresponding account (e.g., "timestamp").

The status updates that can be stored in status update class 1420 can take a variety of forms. For example, in some implementations, the contact's latest status (i.e., "status") is constrained to have one of a predetermined set of allowed values, such as "offline," "invisible," "away," "idle," "do_not_disturb,", and "available," whereas the text of a status update (i.e., "status") can have a range of values such as, e.g., "having lunch" or "enjoying watching Federer rally against Nadal in Palm Springs," as shown in FIG. 7.

A database schema such as database schema 1405 provides a number of different advantages. For example, different numbers of different kinds of accounts can be associated with each contact. The account information is stored in data structures that can accommodate not only a variety of different types of accounts but also new types of accounts as they are developed by different entities that mediate social interaction. In some implementations, information characterizing the accounts can be stored in a single data table, with records characterizing different kinds of accounts interspersed among each other.

A single most recent status update can be stored for each different kind of account, along with information identifying the time when status was last updated by the contact at the corresponding account. In some implementations, the timestamps when status was last updated at the different accounts is used to select one of the status updates for display as the most current status update, e.g., in a social status record 900 (FIG. 9).

Information drawn from a variety of different entities that mediate social interaction can be stored in a single location and integrated for use in presenting one or more of social interaction hubs 200, 300, 400, 500, 600, 700 (FIGS. 2-8) or a social interaction hub that is limited to social status records on a mobile device 105.

Further, access to the information in database schema 1405 is facilitated by database schema 1405. For example, information identifying the raw contacts of a single real-world individual can be accessed relatively quickly by a search of instances of raw contact class 1410. For example, a query can identify the rows or other records in instances of raw contact class 1410 that share the contact_ID of a particular social interaction counterparty when determining which mode indicia are to be included in a particular contact's indicia collection 235. Only after a particular mode indicium has been selected for an outgoing social interact do data points tied to the raw contact corresponding to the selected indicium need to be accessed from contact data class 1415.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular implementations have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed:

1. A data processing device comprising:
a display screen for displaying a social interaction hub, the social interaction hub including a collection of records, wherein particular ones of the records are generated from textual posts created by acquaintances of a user of the data processing device to a first social network and are displayed on the display screen in chronological order with particular ones of the records generated from textual posts that are created by other acquaintances of the user of the data processing device to at least one social network, wherein the first social network includes services that receive textual posts from posting members and provide content of the posts to other members who have a relationship with the posting members, the data processing device having access to:
an initial sender identifier that identifies on a display of the data processing device an initial sender who created a past social interaction event,
a mode indicium that identifies a mode by which the past social interaction event with the initial sender occurred, the mode selected from a plurality of modes of communication that include textual posts to a social network that are broadcast to members of the social network, and
a collection of mode indicia that each identify a mode by which a future, outgoing social interaction event with the initial sender can occur, wherein the collection of mode indicia is based on a current user status of the initial sender regarding modes of interaction by which a user of the data processing device is determined to be currently capable of communicating with the initial sender independent of the mode by which the past social interaction event occurred, the collection determined by selecting a subset of modes from all possible modes of communication available to the data processing device by way of the social interaction hub and which include communication through the first social network, wherein the counterparty identifier, the mode indicium, and the collection of mode indicia are associated with one another in the records of the social interaction hub.

2. The data processing device of claim 1, wherein the first social network is operated by a different entity than is a second social network that receives the textual posts that are created by the other acquaintances of the user of the data processing device, so that the social interaction hub simultaneously displays posts from two separate social networks.

3. The data processing device of claim 1, wherein the data processing device further having access to an availability indicator labeling a first mode indicium in the collection of mode indicia, the availability indicator indicating that the initial sender is presently available for social interaction via the mode identified by the first mode indicium.

4. The data processing device of claim 3, wherein the first mode indicium identifies an electronic messaging mode.

5. The data processing device of claim 1, wherein the data processing device further having access to an interactive graphical element that triggers display of the collection of mode indicia in response to user interaction.

6. The data processing device of claim 1, wherein the data processing device having further access to a description of a subject of the past social interaction event.

7. The data processing device of claim 6, wherein:
a first description of the subject of a first past social interaction event comprises a subject line of an electronic mail or text message; and
a second description of the subject of a second past social interaction event comprises an excerpt of a posting on a social network.

8. The data processing device of claim 1, wherein the social interaction hub further comprises:
information describing a disposition of the currently displayed social interaction records within a larger collection of social interaction records; and
an interactive graphical element that triggers display of additional social interaction records within the larger collection in response to user interaction.

9. A user-portable device comprising:
a display screen;
one or more data communication interfaces;
a data storage device configured to store a message log; and
a data processing system programmed to perform activities in accordance with the logic of one or more sets of machine-readable instructions to execute:
one or more server interface modules for interfacing with a social network server that receives textual posts from posting members of the social network and provides content of the posts to other members who have a relationship with the posting members,
a data aggregation module for aggregating data received from the message log and data received from the one or more server interface modules, and
a user interface module for presenting aggregated data in a collection of records on the display screen, wherein particular ones of the records generated from textual posts by a first user to a first social network and shared by the social network with users identified by the social network as being acquainted with the first user, are displayed on the display screen in chronological order with particular ones of the records generated from other posts, the data processing system having access to:
an initial sender identifier that identifies on a display of the data processing device an initial sender who created a past social interaction event, and
a collection of mode indicia that each identify a mode by which a future, outgoing social interaction event with the initial sender can occur, wherein the collection of mode indicia is based on a user status of the initial sender regarding modes of interaction by which a user of the data process system is currently capable of communicating with the initial sender independent of the mode by which the past social interaction event occurred, the collection determined by selecting a subset of modes from all possible modes of communication available to the data processing device by way of the social interaction hub and which include communication through the first social network,
wherein the data processing system further has access to information received from the message log and information received from one or more server interface modules.

10. The user-portable device of claim 9, wherein the user-portable device further has access to an interactive graphical element that triggers display of the collection of mode indicia in response to user interaction.

11. The user-portable device of claim 9, wherein the user-portable device further has access to a description of a subject of the past social interaction event.

12. The user-portable device of claim 9, wherein:
information received from one or more server interface modules comprises an availability indicator indicating that a second user is presently available for social interaction via a particular mode; and
the data received from the message log comprises a time when a past telephone call occurred.

13. The user-portable device of claim 9, wherein the user-portable device further has access to a social status record characterizing a status of a second user.

14. The user-portable device of claim 9, further comprising a contact information data store storing contact information,
wherein the data aggregation module also aggregates data received from the contact information data store with the data received from the message log and the data received from the one or more server interface modules.

15. The user-portable device of claim 14, wherein the data received from the contact information data store comprises a photo of a second user.

16. The user-portable device of claim 9, wherein:
records in the collection each characterize a past social interaction event; and
the data aggregation module further filters past social interaction events to limit the past social interaction events characterized in the collection.

17. The user-portable device of claim 16, wherein the data aggregation module filters past social interaction events to limit the past social interaction events characterized in the collection based on counterparties involved in the past social interaction events.

18. The user-portable device of claim 9, wherein the data aggregation module further resolves conflicts between data received from the message log and data received from the one or more server interface modules.

* * * * *